US005970217A

United States Patent [19]

Nakamura

[11] Patent Number: 5,970,217

[45] **Date of Patent: *Oct. 19, 1999**

[54] INK JET RECORDING APPARATUS WITH AN INCLINED INK EJECTION SURFACE

[75] Inventor: Fumihiko Nakamura, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/297,819

[22] Filed: Aug. 30, 1994

[30] Foreign Application Priority Data

| | | | |
|---|---|---|---|
| Aug. 31, 1993 | [JP] | Japan | 5-216055 |
| Aug. 8, 1994 | [JP] | Japan | 6-185824 |

[51] Int. Cl.[6] ...... G06F 15/00

[52] U.S. Cl. ...... 395/113; 358/502; 347/44

[58] Field of Search ...... 395/100, 105, 395/109, 112, 113, 117; 358/444, 437; 400/124.08, 124.1, 124.11; 347/1, 4, 20, 40, 44, 56, 66, 75, 108, 138; 399/13, 25, 31, 57, 72, 106, 126, 156

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 347/47 |
| 4,463,359 | 7/1984 | Ayata et al. | 346/1.1 |
| 4,558,333 | 12/1985 | Sugitani et al. | 346/140 R |
| 4,559,544 | 12/1985 | Matsumoto et al. | 346/140 R |
| 4,608,577 | 8/1986 | Hori | 346/140 R |
| 4,694,747 | 9/1987 | Marozzi | 101/301 |
| 4,723,129 | 2/1988 | Endo et al. | 346/1.1 |
| 4,740,796 | 4/1988 | Endo et al. | 346/1.1 |
| 5,126,765 | 6/1992 | Nakamura | 346/140 R |
| 5,455,614 | 10/1995 | Rhodes | 347/74 |
| 5,481,374 | 1/1996 | Tachibana et al. | 358/444 |
| 5,541,626 | 7/1996 | Hiramatsu et al. | 347/8 |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |

*Primary Examiner*—Scott Rogers
*Assistant Examiner*—Gabriel I. Garcia
*Attorney, Agent, or Firm*—Fitzpatrick, Cella, Harper & Scinto

[57] ABSTRACT

A recording part including an ink cartridge is inclined with respect to a horizontal mounting plane to incline the path of a recording sheet with respect to the vertical direction. A footer mark is recorded with an ink ejected from some ejection orifices situated on the upstream side of such an ink cartridge, i.e. from the upper ejection orifices thereof. As a result, the presence or absence of ink within the ink cartridge can be detected promptly, and whether the recording of image data has been performed normally can be judged automatically. A discharge action for the recording medium can be facilitated by utilizing its own weight.

32 Claims, 20 Drawing Sheets

| | PATTERN | | | | JUDGMENT |
|---|---|---|---|---|---|
| P1 | 1 | 0 | 1 | 0 | RECORDING NORMAL SHEET DISCHARGE COMPLETED |
| P2 | 0 | 1 | 0 | | RECORDING NORMAL SHEET DISCHARGE COMPLETED |
| P3 | 1 | 0 | 1 | | RECORDING NORMAL SHEET DISCHARGE INCOMPLETE |
| P4 | 0 | 1 | | | RECORDING NORMAL SHEET DISCHARGE INCOMPLETE |
| P5 | 1 | 0 | | | RECORDING ABNORMAL SHEET DISCHARGE COMPLETED |
| P6 | 1 | | | | RECORDING ABNORMAL SHEET DISCHARGE INCOMPLETE |
| P7 | 0 | | | | RECORDING SHEET ABNORMAL OR SHEET DISCHARGE INCOMPLETE |

WHITE · · · · 1 BLACK · · · · 0

FIG.11

INK JET RECORDING APPARATUS WITH AN INCLINED INK EJECTION SURFACE

BACKGROUND OF THE INVENTION

1. Field of the Invention

The present invention relates to an ink jet recording apparatus, an image forming apparatus, an information processing apparatus, and recorded materials obtained by recording using these apparatuses.

2. Description of the Prior Art (1) So far the following methods of detecting the presence or absence of ink in a recording head (hereinafter referred to as the head) have been proposed in recording devices of the ink jet type, for example, recording devices using the head for ejecting ink by causing a change in condition to the ink by use of thermal energy. One of the methods is to have a means for detecting the temperature of the head, use the temperature detection means in detecting the difference between the temperature before the heater of the head is heated and the temperature after the heater of the head is heated, judge the ink to be present if the temperature difference is smaller than the predetermined value, or judge the ink to be absent if the temperature difference is greater than the predetermined value. This method is based on the fact that the heat capacity of the head becomes large in the presence of the ink, and becomes small in the absence of the ink. Another method comprises providing a pressure sensor in the passage for feeding ink, and judging ink to be present if the value of the pressure sensor is greater than the predetermined value, and ink to be absent if the value of the pressure sensor is lower than the predetermined value. Other methods under consideration rely on the weight of the ink cartridge, the electrical resistance or electrical capacity of the ink, or the transmission of light beams through an optical sensor. These methods make it possible to judge ink to be present in the ink cartridge of the head or ink to be supplied to the head.

(2) That surface of the head which constitutes the ink ejection orifice, namely the ejection surface, is normally vertical, and that portion of the recording sheet which is to be recorded by the head is also vertical. Thus, the recording sheet portion after recording is discharged vertically.

The conventional example (1), however, has the following drawbacks:

Originally, the weakness of the recording device of the ink jet type lies in the clogging of the nozzle due to the drying of the ink or the formation of air bubbles in the nozzle, leading to a failure in ink ejection. This phenomenon may occur from the beginning of recording or during recording.

To overcome this weakness, various countermeasures have been worked out, and perfect measures that permit recovery actions in case of clogging have been proposed. However, complete measures capable of preventing clogging have yet to be established.

As a result, even if the ink presence or absence detection means judges ink to be present, there may be cases in which recording is not done once clogging has happened.

If a recording device of the ink jet type is used as one for facsimile, the following trouble may happen: When data is received based on the judgment of ink presence, a recording action is performed, and a confirmation of reception completed is made to the transmitter, no images are recorded on the recording sheet or images are not recorded halfway in the page, once clogging has occurred. In such cases, fatal troubles arise in which the transmitter believes communication to have been completed normally and the contents of the original to have been transmitted, whereas the receiver has not received normal recordings.

In short, the conventional methods are not enough to detect completely whether the reception and recording of information via the facsimile apparatus have been performed normally.

With the conventional example (2), when the recording medium after recording is discharged vertically, it is not definitely known whether it will fall on the discharge tray side or on the opposite side. If it has fallen on the opposite side, the operator has to bring it onto the discharge tray side, which is quite tiresome. It is possible to provide a conveyor path to make the recording medium after recording fall on the discharge tray side. The providing the conveyor path, however, makes the device become complicated and scaled up. In this case, further, it is fear that the recording medium just after recording is curved to touch the ink ejection orifice. Furthermore, there is fear to stain non-recording region of the recording medium with un-dried ink due to the contact between a device such as rollers for conveying the recording medium in the conveyor path and the recording medium just after recording which has the un-dried ink on its surface. These are troublesome.

SUMMARY OF THE INVENTION

The object of the present invention is to provide a recording apparatus, an image forming apparatus, and an information processing apparatus which are free from the above-described problems, which are easy for users to use, and which are higher in quality than the conventional devices.

To attain the above object, this invention is characterized by performing recording using an recording head whose ink ejection surface is inclined with respect to the vertical direction.

Furthermore, the present invention is characterized by a recording apparatus which performs recording using a recording head for recording images corresponding to image data onto a recording medium; and which has a controlling means for controlling the recording head so that a predetermined image is recorded only by a part of the recording head onto a predetermined position of the recording medium after a predetermined amount of image recording by the recording head has been completed, a detecting means for detecting the predetermined image on the recording medium, and a judging means for judging the state of recording by the recording head on the basis of the results of detection by the detecting means.

The present invention will be described more detailedly.

An ink jet recording apparatus according to the present invention which performs recording using a recording head whose ink ejection surface is inclined with respect to the vertical direction.

Here, the sharp angle of the ink ejection surface to the vertical direction may be within 60°.

According to another aspect of the present invention, there is provided an ink jet recording apparatus which performs recording using a recording head for recording an image corresponding to image data onto a recording medium, comprising: control means for controlling the recording head so that a predetermined image may be recorded only by a part of the recording head at a predetermined position of the recording medium after a predetermined amount of image recording by the recording head is completed, detection means for detecting the predetermined image on the recording medium, and judgment means for judging the state of recording by the recording head on the basis of the results of detection by the detection means.

Here, the ink ejection surface of the recording head may be inclined with respect to the vertical direction.

The sharp angle of the ink ejection surface of the recording head to the vertical direction may be within 60°.

The recording head may eject ink by causing a change in state to the ink by use of thermal energy.

According to another aspect of the present invention, there is provided an image forming apparatus which performs recording using a recording head whose ink ejection surface is inclined with respect to the vertical direction.

Here, the sharp angle of the ink ejection surface to the vertical direction may be within 60°.

According to another aspect of the present invention, there is provided an image forming apparatus which performs recording using a recording head for recording an image corresponding to image data onto a recording medium, comprising: control means for controlling the recording head so that a predetermined image may be recorded only by a part of the recording head at a predetermined position of the recording medium after a predetermined amount of image recording by the recording head is completed, detection means for detecting the predetermined image on the recording medium, and judgment means for judging the state of recording by the recording head on the basis of the results of detection by the detection means.

Here, the ink ejection surface of the recording head may be inclined with respect to the vertical direction.

The sharp angle of the ink ejection surface of the recording head to the vertical direction may be within 60°.

The recording head may eject ink by causing a change in state to the ink by use of thermal energy.

The image forming apparatus may further include means for receiving image information.

The image forming apparatus may further include means for transmitting image information.

The image forming apparatus may further include means for receiving image information and means for transmitting image information.

The image forming apparatus may further include means for reading the image of an original.

The image forming apparatus may further include means for printing a footer mark.

Here, the apparatus may further include a photosensor, and said footer mark has its size in a range where the footer mark can be detected by the photosensor.

The image forming apparatus may further include means for inputting a record signal.

Here, the apparatus may further include means for receiving image information and means for printing a footer mark, and having a mode for recording a image based on the image information inputted through the record signal inputting means and a mode for recording a image based on the image information inputted through the image information receiving means, and being set not to print the footer mark at the time to record the image based on the image information inputted through the record signal inputting means.

The record signal inputting means may be a key board.

According to another aspect of the present invention, there is provided an information processing apparatus comprising an ink jet recording apparatus and means for computation, wherein the ink jet recording apparatus performs recording using a recording head whose ink ejection surface is inclined with respect to the vertical direction.

Here, the sharp angle of the ink ejection surface to the vertical direction may be within 60°.

According to another aspect of the present invention, there is provided an information processing apparatus comprising an ink jet recording apparatus and means for computation, wherein the ink jet recording apparatus performs recording using a recording head for recording an image corresponding to image data onto a recording medium, comprising: control means for controlling the recording head so that a predetermined image may be recorded only by a part of the recording head at a predetermined position of the recording medium after a predetermined amount of image recording by the recording head is completed, detection means for detecting the predetermined image on the recording medium, and judgment means for judging the state of recording by the recording head on the basis of the results of detection by the detection means.

Here, the ink ejection surface of the recording head may be inclined with respect to the vertical direction.

The sharp angle of the ink ejection surface of the recording head to the vertical direction may be within 60°.

The recording head may eject ink by causing a change in state to the ink by use of thermal energy.

According to another aspect of the present invention, there is provided a recorded material as recorded by use of the recording apparatus.

Also, provided a recorded material as recorded by use of the image forming apparatus.

And also, provided a recorded material as recorded by use of the information processing apparatus.

According to the present invention, moreover, the recording medium after recording is discharged by its own weight onto a discharge tray, and a predetermined modest image is recorded onto a predetermined position of the recording medium after a predetermined amount of image recording on the recording medium has been completed.

The above and other objects, efforts, features and advantages of the present invention will become more apparent from the following description of embodiments thereof taken in conjunction with the accompanying drawings.

BRIEF DESCRIPTION OF THE DRAWINGS

FIG. 11 is a view showing correspondences between changing patterns of detecting means 14*a* and judgments of recording actions;

DETAILED DESCRIPTION OF PREFERRED EMBODIMENTS

EMBODIMENT 1

Figure 1:
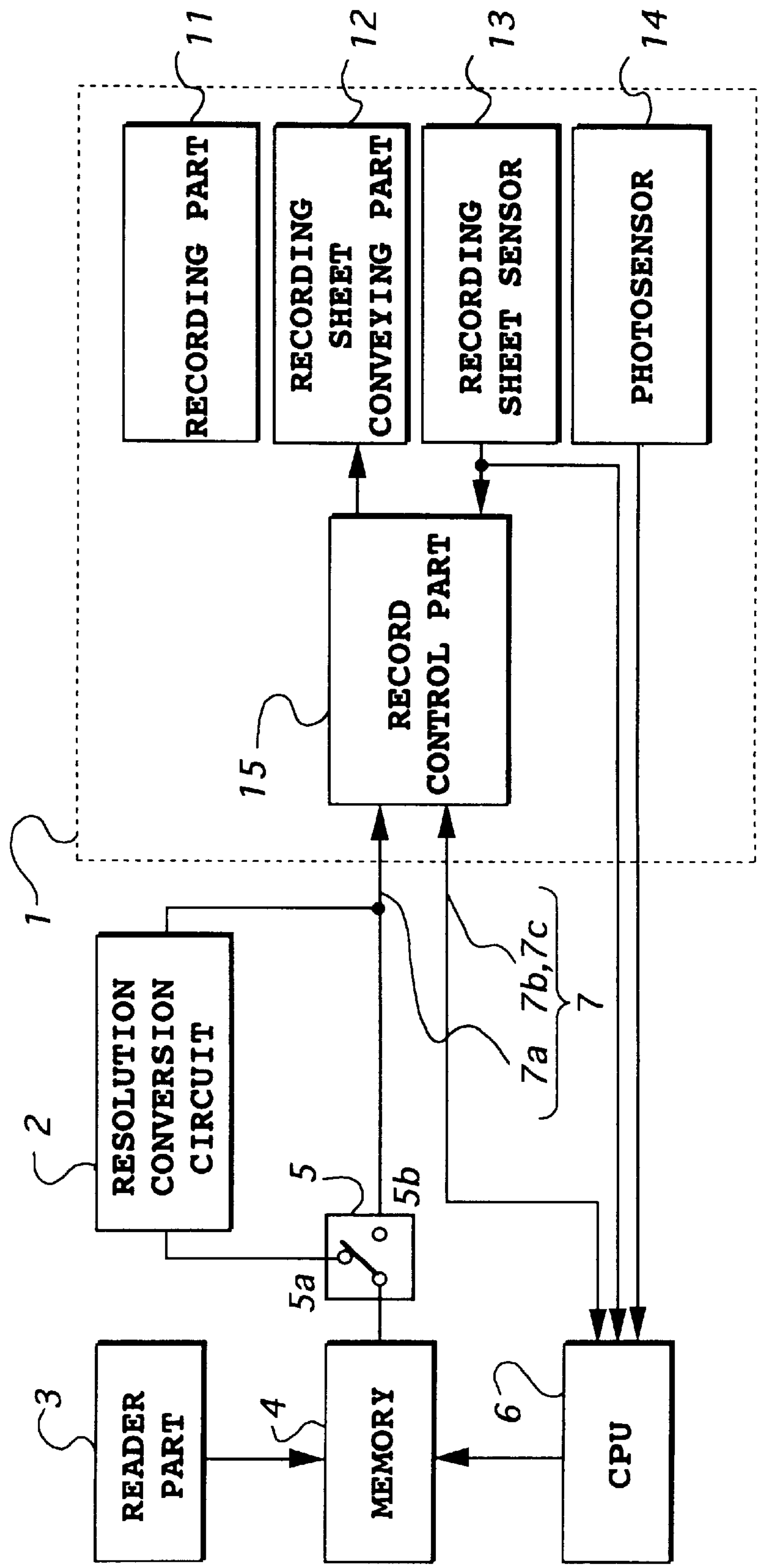
FIG. 1 is a block diagram showing the structure of a main part of a facsimile apparatus according to a first embodiment of the present invention.

FIG. 1 is a block diagram showing the structure of a main part of a facsimile apparatus in accordance with the present invention. In this drawing, the reference numeral 1 is a recorder part using a head with a recording density of 360 dpi for recording onto a recording sheet. In the instant embodiment, ink is ejected from the head by causing a change in condition to the ink by use of thermal energy. The numeral 2 is a resolution conversion circuit for converting a resolution of 8 pels×7.7 lines/mm (hereinafter called resolution A) and a resolution of 8 pels×0.85 lines/mm (hereinafter called resolution B) into a resolution of 360 dpi×360 dpi (hereinafter called resolution C). The numeral 3 is a reader part with a resolution of 8 pels×3.85 or 7.7 lines/mm for reading an original. The numeral 4 is a memory part with 4 Mbits for storing the image information of the original and received image information read by the reader part 3, as well as control data for controlling the recorder part 1. The numeral 5 is a change-over circuit for selecting whether to convert resolution or not. Connection with the 5*a* side results in the conversion of resolution by the resolution conversion circuit 2, while connection with the 5*b* side results in the transfer of data to the recorder part 1 without conversion of resolution. The numeral 6 is a CPU for controlling the entire apparatus. The numeral 7 is control signal wires for use by the CPU 6 in controlling a record control part 15. There are other well known constituent elements, such as MODEM, NCU and an operating part, but they are not shown.

Figure 2:
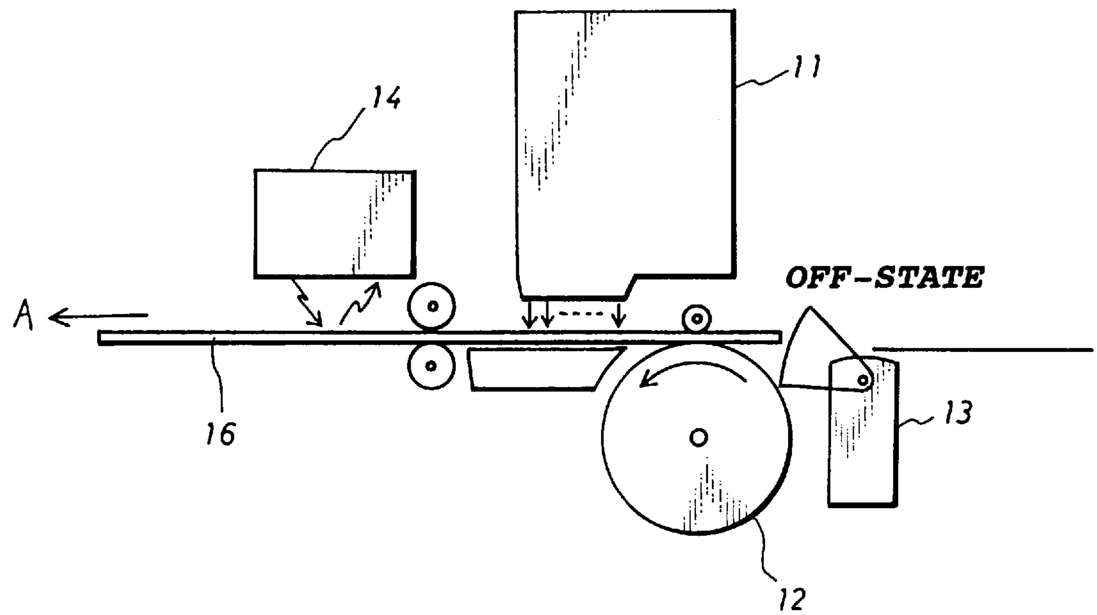
FIG. 2 is a layout diagram of the constituent elements of a recording apparatus according to the present invention.

Next, the structure of the recorder part 1 will be described in detail with reference to FIG. 2. In the drawing, the numeral 11 is a recording part which has a row of 64-dot nozzles for recording at a recording density of 360 dpi in a sub-scanning direction (direction of arrow A), and which has a head with a recording density of 360 dpi×360 dpi for recording at a recording density of 360 dpi while traveling in a main scanning direction (direction perpendicular to the sheet surface of the drawing; direction of arrow B in FIG. 3). The numeral 12 is a recording sheet conveying part with a feed accuracy of 360 dpi steps for feeding or discharging a recording sheet (cut sheet 16) and for determining the position of the recording sheet in the sub-scanning direction when recording is performed at the recording part 11. The numeral 13 is a recording sheet sensor for detecting the presence or absence of the recording sheet 16 and the front end or rear end of the recording sheet 16 in such a manner that the sensor 13 becomes ON-state when the recording sheet 16 is present, and Off-state when the recording sheet 16 is absent. The numeral 14 is a reflector photosensor which detects the density of the recording surface of the recording sheet 16. The record control part 15 converts data so that image data transmitted from the CPU 6 can be recorded by the recording part 11, or controls the recording part 11, recording sheet conveying part 12, and recording sheet sensor 13 in accordance with instructions of control data sent from the CPU 6.

Next, the principle of resolution conversion will be explained.

With a facsimile apparatus in which resolutions for reading and recording are different or which has a recording density different from the resolution of facsimile communication, a resolution conversion circuit is required, because a received image or copied image needs to be recorded to the same size as that of the original. Assume, for example, that image data read at a resolution of 8 pels×7.7 lines/mm is to be recorded with a 360 dpi×360 dpi head. If recording is done such that one pixel for recording corresponds to one pixel for reading, image is recorded at a reduction ratio of 0.564 (8 pels/360 dpi) in the main scanning direction and a reduction ratio of 0.543 (7.7 lines/mm/360 dpi) in the sub-scanning direction. Thus, the original data, 9 bits, is expanded into 16 bits in the main scanning direction, and a 6-bit data is expanded to 11 bits in the sub-scanning direction. In this case, $0.564\times(16/9)=1.003$ for main scanning $0.543\times(11/6)=0.996$ for sub-scanning, permitting nearly equal-magnification recording for both directions.

Figure 3A:
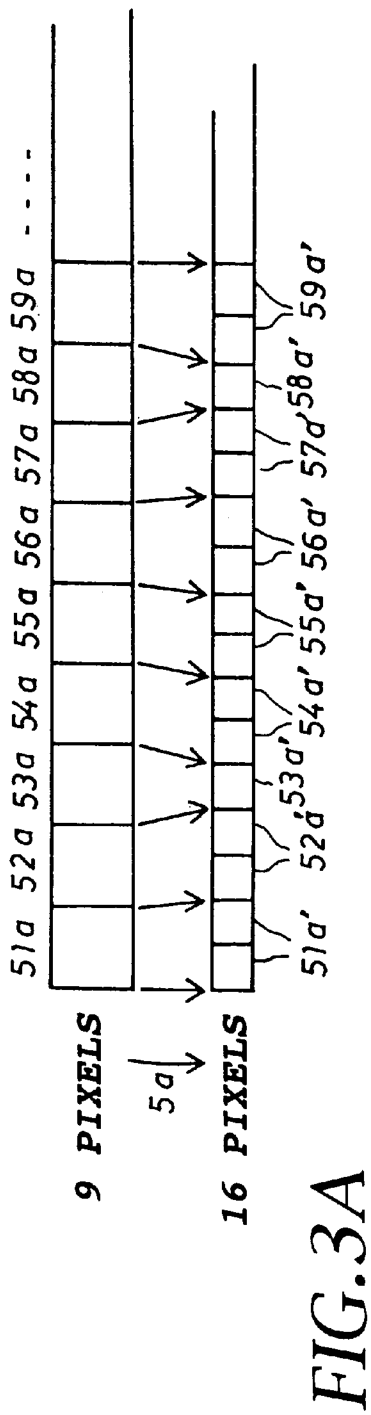
FIGS. 3A and 3B are each a conceptual view of resolution conversion in the directions of main scanning and subscanning.
Figure 3B:
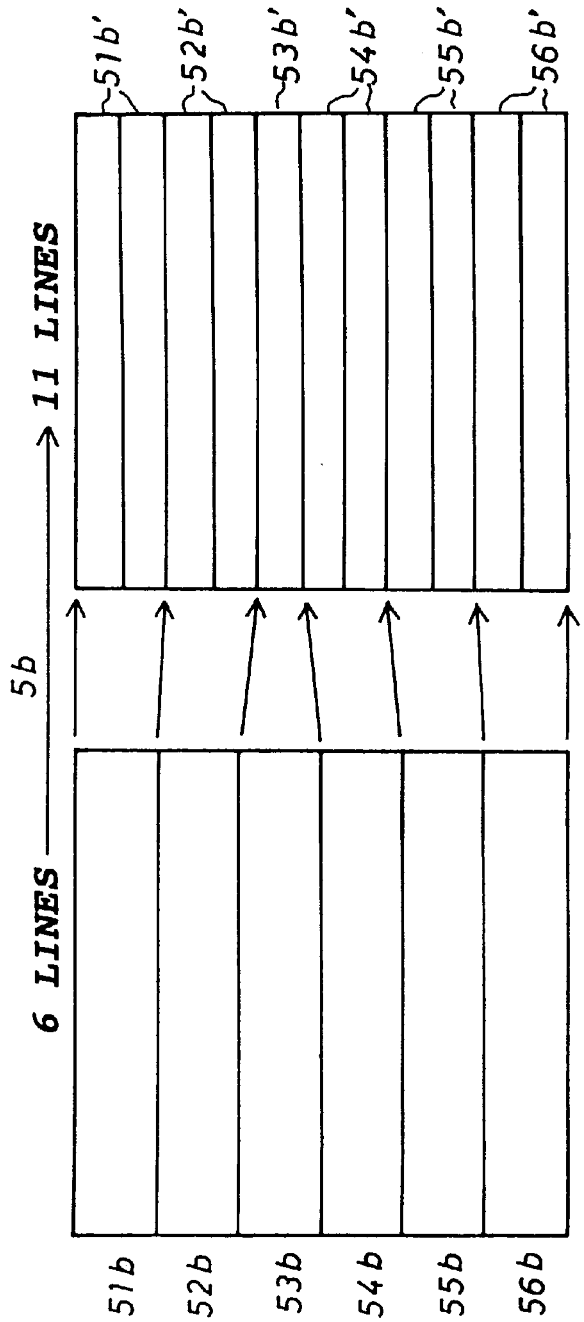

FIG. 3 briefly illustrates the concept of resolution conversion for copying of an image read and for recording of an image received. In the drawing, 5*a* represents resolution conversion in the main scanning direction. A read pixel 51*a* is replaced by 51*a′* corresponding to 2 record pixels, and 53*a* is replaced by 53*a*' corresponding to one record pixel, whereby the equal-magnification recording in the main scanning direction becomes possible. On the other hand, 5*b* represents resolution conversion in the sub-scanning direction. A line of read pixels, 51*b*, is replaced by 51*b′* corresponding to 2 lines of record pixels, and 53*b* is replaced by 53*b′* corresponding to one line of record pixel, whereby the equal-magnification recording in the sub-scanning direction becomes possible. This resolution conversion circuit uses a simple latch circuit for the main scanning direction, and carries out software-controlled double writing of the same line for the sub-scanning direction.

The memory 4 shown in FIG. 1 stores image data received by a MODEM (not shown) and image data read by the reader part 3, as well as arbitrary image data prepared by the CPU 6 and control data for the record control part 15.

With facsimile reception, image data comes in at a resolution of 8 pels×3.85 or 7.7 lines/mm. Hence, the CPU 6 performs control so that the image data stored in the memory 4 from the MODEM (not shown) may be subjected to resolution conversion by the resolution conversion circuit 2 via a connection to the 5*a* side of the change-over circuit 5, whereby the data will be recorded at the same magnification as the original transmitted.

Image data read by the reader part 3 is also treated in the same way as above to give a copy of the same magnification.

If the change-over circuit 5 is connected to the 5*b* side, image data from the memory 4 is not subjected to resolution conversion, but one pixel thereof can be recorded by the recorder part 1 in correspondence with one pixel for recording. When the control data is to be fed to the record control part 15, the change-over circuit 5 is connected to the 5*b* side in advance.

Figure 4:
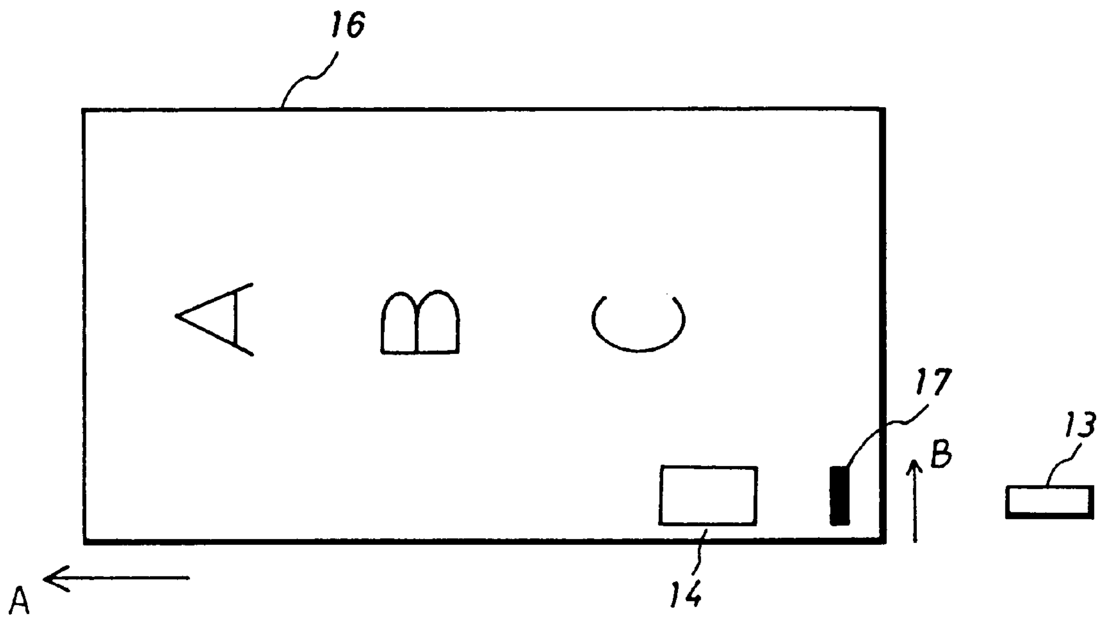
FIG. 4 is a view showing the relationship among a recording sensor, a photosensor, and the position of recording of a footer mark in the recording apparatus of the present invention.

FIG. 4 shows the positional relationship between the recording sheet sensor 13 and the photosensor 14. In the drawing, the numeral 17 signifies a footer mark to be described later, and the position where it is recorded. Here, the sensors 13, 14 and the mark 17 are arranged so as to come on the same straight line in the direction of conveyance of the recording sheet (direction A). They are also arranged at the leftmost end of the recordable range of the recording part 11 for the recording sheet 16. The footer mark record position 17 can be provided at a position which will enable a predetermined length of a blank recording sheet space to be left at the rear end of the recording sheet 16.

Figure 5:
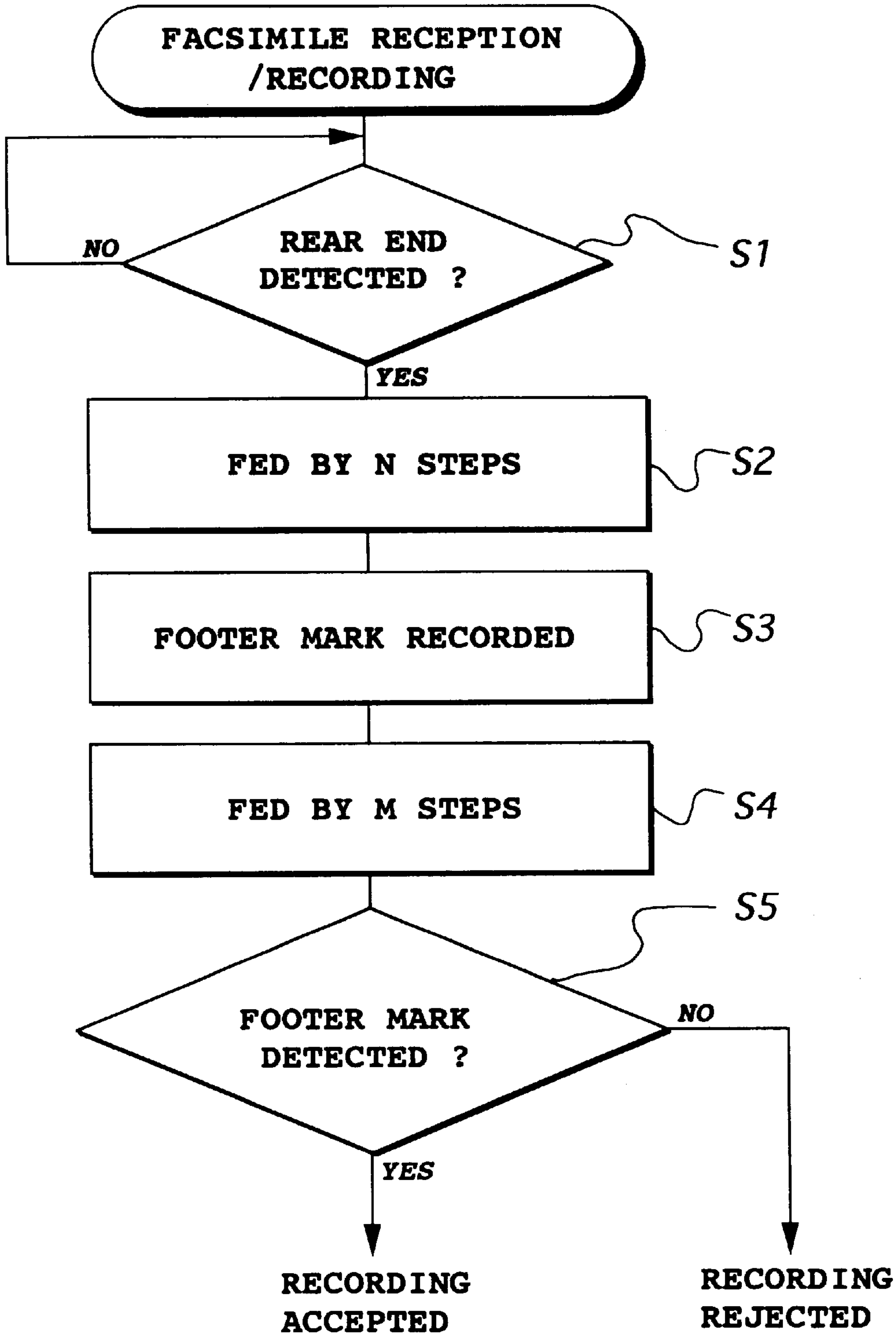
FIG. 5 is a flow chart for judgment of whether recording has been performed normally or not in the recording apparatus of the present invention.

Next, control at the time of recording a facsimile-received image will be described. When the front end of the recording sheet 16 reaches the recording sheet sensor 13, the sensor 13 becomes ON-state. From there, a predetermined length of the recording sheet 16 is conveyed by the recording sheet conveying part 12, thereby moving the recording sheet 16 to a recording position of the recording part 11. Beginning from this position where the recording sheet 16 has been moved, the record control part 15 controls the recording part 11 and the recording sheet conveying part 12, thereby recording onto the recording sheet 16 a one-page equivalent of image data after resolution conversion that has been obtained from the resolution conversion circuit 2. A subsequent control will be described below with reference to the flow chart of FIG. 5. In the instant embodiment, storage of received image data into the memory 4 and its recording are performed parallelly.

Figure 6:
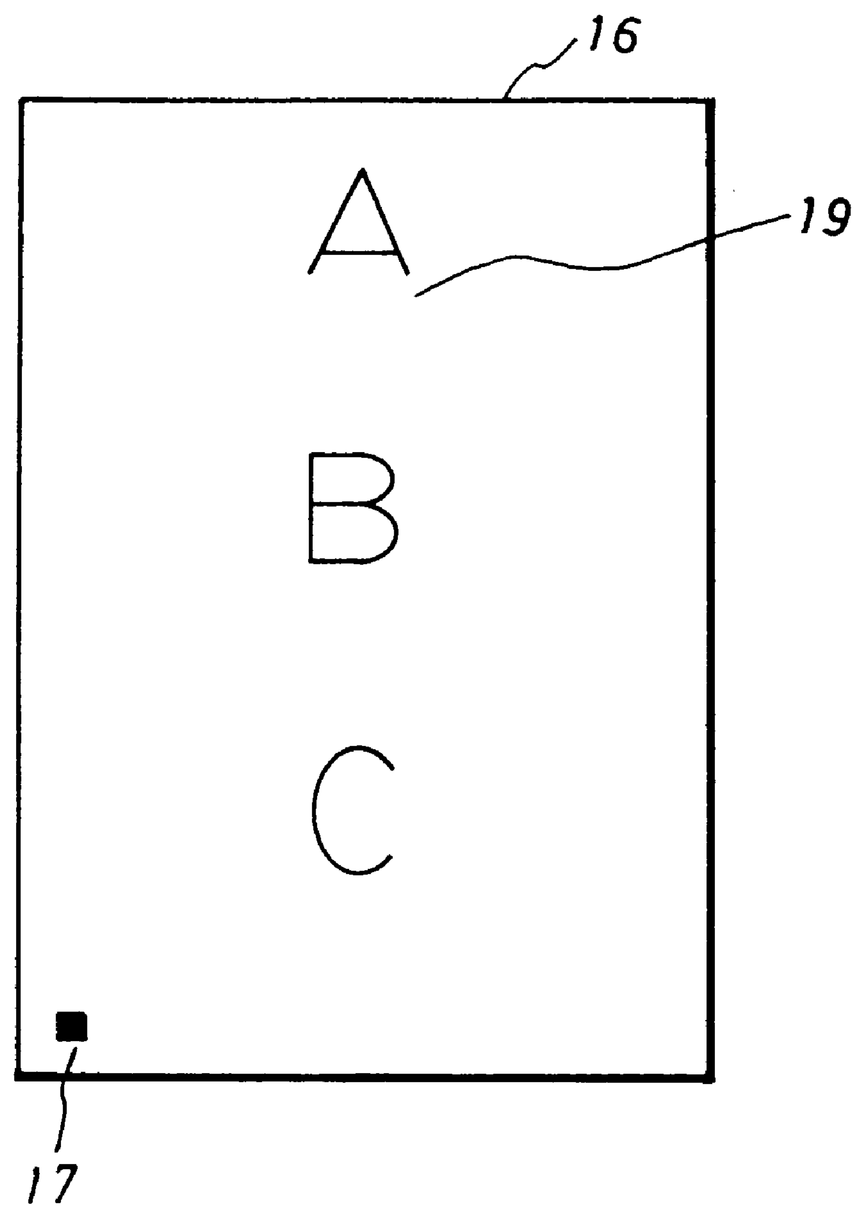
FIG. 6 is a view showing another example of a footer mark record in the present invention.

First, while recording is being done onto the recording sheet 16, the OFF-state of the recording sheet sensor 13 is checked at step S1. When OFF-state is attained (namely, when the rear end of the recording sheet 16 is detected), the procedure goes to step S2. The recording sheet 16 is conveyed by the recording sheet conveying part 12 until the footer mark record position 17 arrives at the record position of the recording part 11. The number of steps for conveyance is set at N (the distance traveled divided by 1/360 inches). Then at step S3, a footer mark is recorded by the recording part 11 onto the footer mark record position 17 of the recording sheet 16 illustrated in FIG. 6. This footer mark is an image obtained by storing CPU 6-produced image data into the memory 4, and transferring it to the record control part 15 via the 5*a* side of the change-over circuit 5.

Here, 16 of 64 nozzles possessed by the recording part 11 that constitutes the present invention are used, and an all black rectangle with a width of about 1 mm, corresponding to a record width for 16 dots, and a dimension of 4.5 mm in the main scanning direction is employed as the footer mark. By decreasing the aperture of the lens of the photosensor 14 to be described later, it has been demonstrated that detection by the photosensor 14 is possible even if the record width of the footer mark is decreased to about 0.5 mm. By so doing, the footer mark can be made less showy, thus making the entire recording sheet free from degraded recording.

At step S4, the recording sheet 16 is conveyed by the recording sheet conveying part 12 so that the position of the footer mark record position 17 may be moved to the detection position of the photosensor 14. The number of steps for this conveyance is set at M. At the step S4, the density of the footer mark record position 17 is detected by the photosensor 14. If the footer mark has been recorded at the position where there should be the footer mark record position 17, reflected light is small. Based on this fact, it is judged that the footer mark has been detected, and recording has been done normally. If recording has not been performed normally owing to the absence of ink in the recording part 11 or the clogging of the nozzles of the recording part 22, no footer mark has been recorded at the footer mark record position 17 of the recording sheet 16. Therefore, reflected light at the position where there should be the footer mark becomes large. In this case, the photosensor 14 detects that the footer mark has not been recorded, and the CPU 6 judges records to be abnormal. The CPU does not erase, but retains, the received image data of the current page stored in the memory, and informs the user of abnormal recording by, say, emitting predetermined interrupted tones from the speaker or the like within the facsimile apparatus. After a recovery operation or head replacement is performed, receiving and recording actions are done again in accordance with the predetermined operating procedure to ensure completion of recording. If it is detected that the footer mark has not been recorded normally, the procedure may be switched to a delayed delivery service mode. In this case, the image data of the current page stored in the memory 4 and image data to be sent in subsequently may be stored in the memory 4, and after recovery operation, head replacement, etc., the image data stored by the predetermined procedure may be recorded.

In the instant embodiment, the CPU 6 controls the apparatus such that the footer mark is recorded only at the time of recording the received image, and is not recorded during copying or during recording of reports such as message control reports. This is because copying or report recording is an activity intentionally done by the user in situ. Thus, in case of abnormal recording, a countermeasure can be left to the user, and there is no need for the facsimile apparatus to judge automatically. In case of copy taking, moreover, it is advisable not to record other parts than the image information of the original to be read.

In case recording is performed onto a cut sheet, the received image information equivalent to one page may fail to be recorded onto one cut sheet alone. In this case, a well known method, divided recording, is available. Even divided recording is controlled such that a footer mark is recorded onto a predetermined place at the rear end of each cut sheet.

Figure 7:
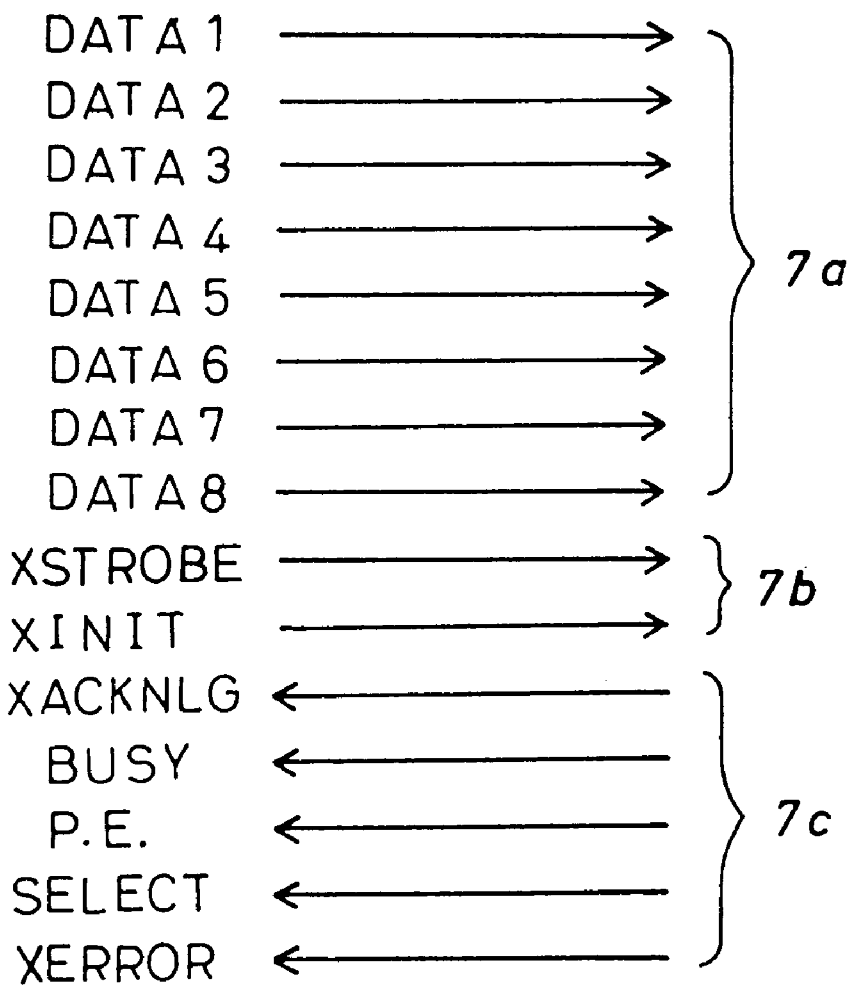
FIG. 7 is a view showing control signals for controlling the recording apparatus in the preset invention.

FIG. 7 shows the signal names of the control signal wires 7. These control signals comply with the Centronics Interface well known as a printer interface used as a terminal of a personal computer or the like. The numeral 7*a* is data wires for issuing control commands or image data (DATA 1–8); 7*b* is strobing signals (XSTROBE) or initializing signals (XINIT) for 7*a;* and 7*c* is status signals showing the status of the printer (XACKNLG, BUSY, P.E., SELECT, XERROR). The signals of 7*a* and 7*b* are input signals for the printer, while 7*c* is output signals. By using such control signals, the recorder part 1 can be controlled by the CPU 6 in the same manner that a printer is controlled by a personal computer.

EMBODIMENT 2

Figure 8:
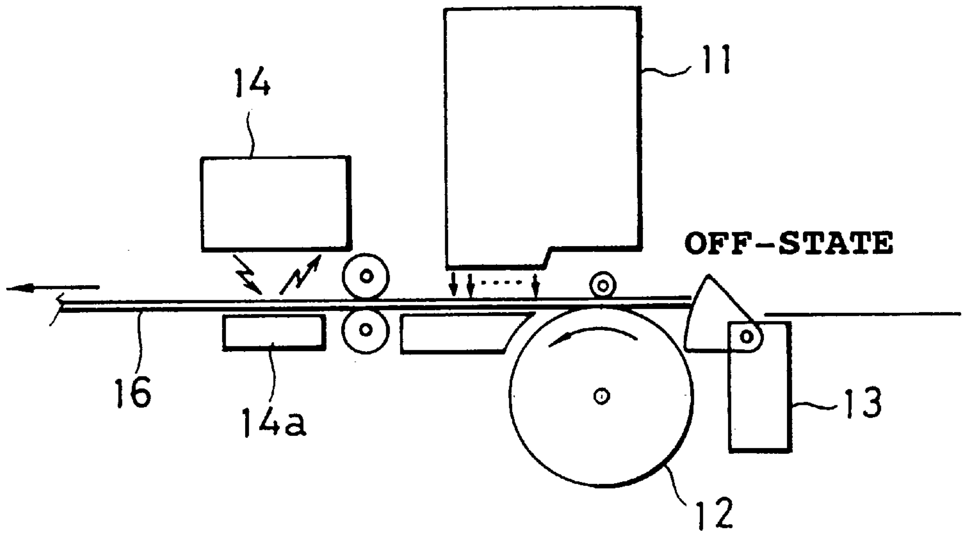
FIG. 8 is a layout diagram showing another layout of the constituent elements of the recording apparatus according to a second embodiment of the present invention.
Figure 9:
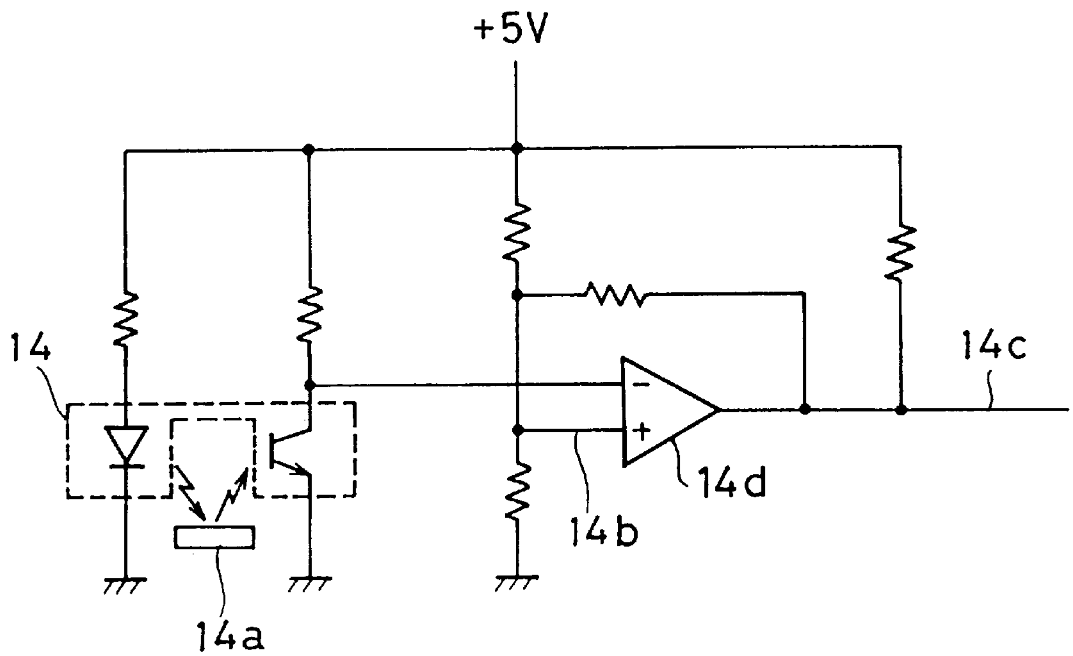
FIG. 9 is a circuit diagram of means for converting output from photosensor 14 into binary digits in the present invention.

FIG. 8 shows the essential part of a second embodiment of the present invention. This embodiment is characterized in that a black member 14*a* for suppressing the reflection of light is provided immediately below the detection position of a photosensor through which a recording sheet 16 passes; and reflected light is not supplied to the photosensor 14 if the recording sheet 16 is not present immediately above the member 14*a*. Other construction is the same as in Embodiment 1, except for the manner of control for recording facsimile-received image. A circuit for converting output from the photosensor into binary digits is illustrated in FIG. 9. By suitably setting a reference voltage 14*b* to be entered as the noninverting input to an operational amplifier (op amp) 14*d,* a detection output 14*c* of the op amp 14*d* can be determined depending on the magnitude of the output of the photosensor 14 to be entered as the inverting input to the op amp 14*d,* namely reflected light from the detection position (position of the member 14*a*). The detection output 14*c* is connected to the CPU 6. If the detection position is below a predetermined density as when the white background of the recording sheet 16 has been detected, the level of reflected light to the photosensor 14 becomes high, thus making the detection output 14*c* a high level 1 (white level). If the detection position is above the predetermined density as when the portion recorded by the recording part 11 has been detected in the recording sheet or as in the absence of the recording sheet 16, the level of reflected light to the photosensor 14 becomes low, thus making the detection output 14*c* a low level 0 (black level).

As noted previously, the footer mark record position 17 is provided such that a predetermined length of the white ground of the recording sheet is surely retained at the rear end of the recording sheet 16.

Figure 10:
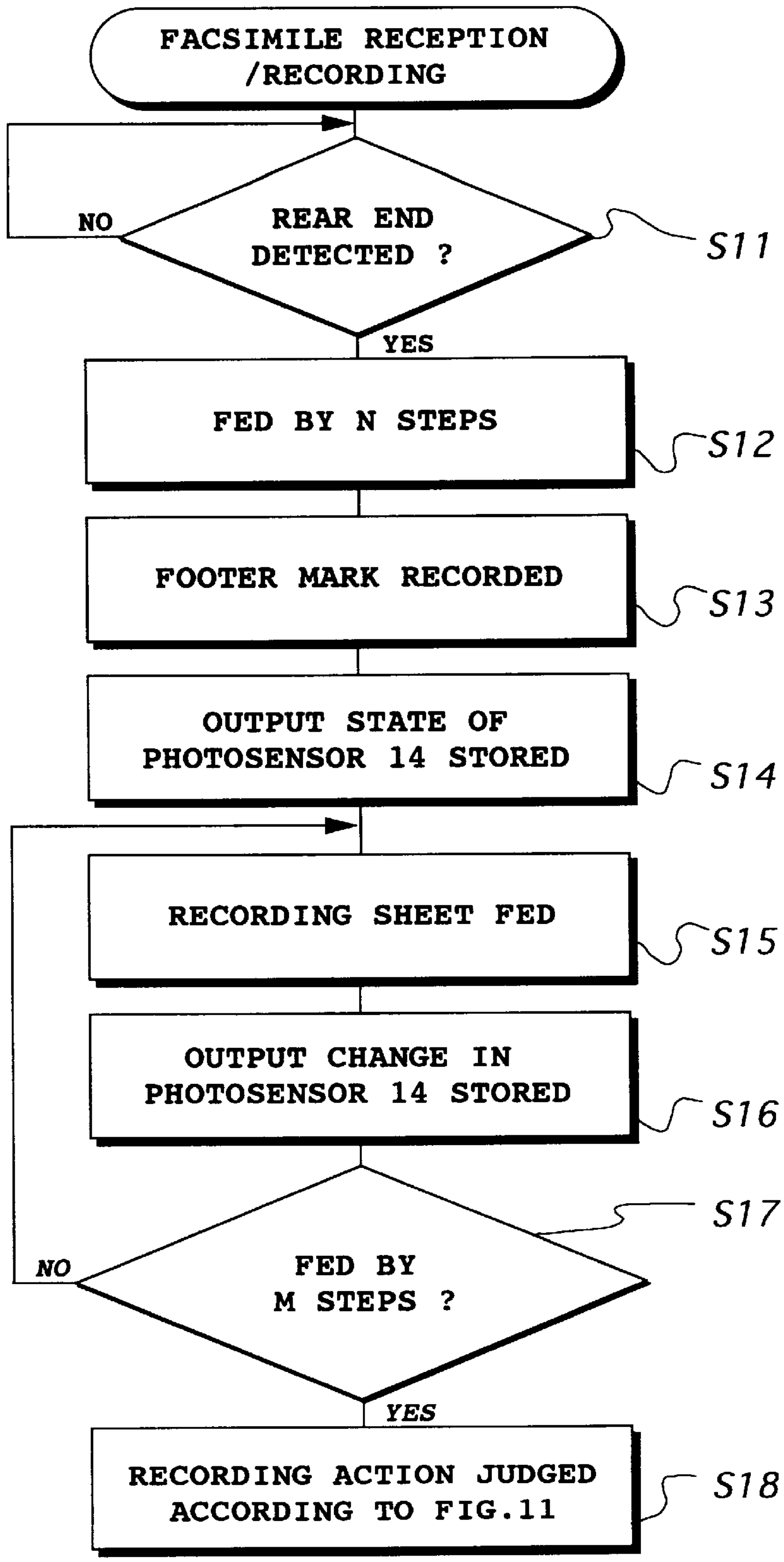
FIG. 10 is another flow chart for judgment of whether recording has been performed normally or not in the recording apparatus of the present invention.

Next, control at the time of recording a facsimile-received image will be described. When the front end of the recording sheet 16 reaches the recording sheet sensor 13, the sensor 13 becomes ON-state. From there, a predetermined length of the recording sheet 16 is conveyed by the recording sheet conveying part 12, thereby moving the recording sheet 16 to a recording position of the recording part 11. From there, the record control part 15 controls the recording part 11 and the recording sheet conveying part 12, thereby recording onto the recording sheet 16 image data after resolution conversion that has been obtained from the resolution conversion circuit 2. A subsequent control will be described below with reference to the flow chart of FIG. 10.

While recording is being done onto the recording sheet 16, the OFF-state of the recording sheet sensor 13 is checked at step S11. When OFF-state is attained (namely, when the rear end of the recording sheet 16 is detected), the procedure goes to step S12. The recording sheet 16 is conveyed by the recording sheet conveying part 12 until the footer mark record position 17 arrives at the record position of the recording part 11. The number of steps for conveyance is set at N (the distance traveled divided by 1/360 inches). Then at step S13, a footer mark is recorded by the recording part 11 onto the footer mark record position 17 of the recording sheet 16. This footer mark is an image obtained by storing CPU 6-produced image data into the memory 4, and transferring it to the record control part 15 via the 5*a* side of the change-over circuit 5. Here, 16 of 64 nozzles possessed by the recording part 11 that characterizes the present invention are used, and an all black square with a dimension of about 1 mm each, corresponding to a record width for 16 dots, is employed as the footer mark.

Then, at step S14, the state of the detection output 14*c* of the photosensor 14 is stored in the memory 4. At step S15, the recording sheet 16 is fed by a predetermined number of steps. At step S16, only when the state of the detection output 14*c* has changed, this state is stored in the memory 4. Step S17 is designed to judge whether or not the recording sheet conveying part 12 has conveyed the recording sheet 16 until the rear end of the recording sheet 16 passes the detection position. In case the answer is NO, the procedure is returned to step S15. In case of YES, the procedure proceeds to step S18. There, the number of steps for conveyance existing from the recording of the footer mark until its passage through the detection position is set at M (the distance traveled divided by 1/360 inches). At step S18, a judgment is made of whether or not recording has been done normally in accordance with the changing pattern of the detection output 14*a* stored in the memory.

The correspondences between the changing patterns (Patterns P1 through P7) of the detection output 14*c* and judgments of recording activity are shown in FIG. 11. P1 represents the case in which the white ground of the recording sheet 16 is detected at step S14, whereafter the black of the footer mark of the recording sheet 16, the white ground of the rear end, and the member 14*a* are detected after discharge of the recording sheet 16. P2 represents the case in which the portion recorded by the recording part 11 is detected in the recording sheet 16 at step S14, whereafter the black of the footer mark passes, the white ground of the rear end of the recording sheet 16, and the member 14*a* are detected after discharge of the recording sheet 16. P3 is the same as P1 except for its last stage in which the member 14*a* is not detected after discharge of the recording sheet 16. P4 is the same as P2 except for its last stage in which the member 14*a* is not detected after discharge of the recording sheet 16. P5 represents the case in which the white ground of the recording sheet 16 is detected at step S14, and the white ground at the rear end, and the member 14*a* are detected after discharge of the recording sheet 16. P6 represents the case in which the white ground of the recording sheet 16 is detected at step S14, and the white ground of the recording sheet 16 continues to be detected thereafter. P7 represents the case in which the black level continues to be detected.

In the case of P1 and P2, it is judged that recording has been completed normally, and the recording sheet has been discharged normally. In the case of P3 and P4, it is judged that recording has been completed normally, but the recording sheet has not been discharged normally. In the case of P5, it is judged that recording has not been done normally owing to the failure in detection of the footer mark, or the absence of ink in the recording part 11, or the clogging of the nozzles of the recording part 11, but the recording sheet 16 has been discharged normally. The case P6 results in the judgment that recording has not been done normally as in the case of P5, nor has the recording sheet 16 been discharged normally. The case P7 results in the judgment that no feeding of the recording sheet 16 has occurred, with the recorded black being detected, because of malfunction of the recording sheet conveying part 12, or that a sheet with a high density of black has been used as a recording sheet.

In the case of P3 or P4, the user is informed that malfunction of conveying the recording sheet is occurred. For example, the user is informed that malfunction of conveying the recording sheet such as no feeding of the recording sheet by emitting predetermined intermittent tones from the speaker as an alarm sound, so as to prompt the user to the malfunction as soon as possible.

In the case of P5, P6 or P7, the CPU 6 does not erase the received image data stored in the memory 4, but informs the user of abnormal recording, by, say, emitting predetermined intermittent tones from the speaker or the like within the facsimile apparatus; and carries out reception and recording again in accordance with the predetermined operating procedure after the recovery activity or head replacement, so that recording can be completed without fail.

The first embodiment makes it a prerequisite that a footer mark be present at a predetermined position of the recording sheet. If the user forcibly withdraws the recording sheet immediately after the recording of the footer mark, the footer mark will be detected in the absence of the recording sheet at the detection position. Consequently, a judgment of the black level will always be made, and a judgment of recording having been performed normally will be rendered. This trouble can be resolved because of the above prerequisite of the instant embodiment.

The CPU 6 controls the apparatus such that the footer mark recording described above is performed only at the time of recording a received image, and not performed during copying or during recording of reports such as message control reports.

After the front end of the recording sheet 16 is detected by the sensor 13, the recording sheet is conveyed by a predetermined number of steps by means of the recording sheet conveying part 12. If, even in this case, the rear end of the recording sheet 16 cannot be detected by the sensor 13, a judgment can be made that a conveyance trouble due to a jam of the recording sheet or the like has occurred, or that the recording sheet with a larger length than the predetermined length has been mounted. Thus, an abnormal state can be detected before the recording of the footer mark. On this occasion, predetermined intermittent tones are emitted from the speaker or the like within the facsimile apparatus to inform the user and prompt him or her to get rid of the abnormal state. Therefore, the fact that control proceeds to step S13 for recording the footer mark, no doubt, means that the recording sheet can be discharged normally. Hence, there is no need to compare the patterns to up to P1 and P2 in FIG. 11. P3 and P4 are enough for a judgment of whether normal recording has been done or not.

If the size of the recording sheet used is restricted (including the case in which the user can select the size by the change-over switch or the like), the image size (including the footer mark) that can be recorded onto one recording sheet is determined. This makes possible the control that after the front end of the recording sheet is detected, the recording sheet is conveyed until a predetermined foremost recording position is reached, whereafter recording is done. On this occasion as well, the image size is set such that there can be a predetermined length of white ground between the rear end of the footer mark and the rear end of the recording sheet. If a shorter recording sheet than the restricted recording sheet size is mounted, it can be detected by the detection of the rear end of the recording sheet 16 by the sensor 13 during the recording action. In this case, the user is warned by an alarm and the information displayed on the LCD: "Please check the size of the recording sheet." If, on the other hand, a longer recording sheet than the restricted recording sheet size is mounted or if a jam of the recording sheet occurs, it can be detected by the failure of the sensor 13 to detect the rear end of the recording sheet 16, even after the M-step conveyance during sheet discharge subsequent to recording of the footer mark. In this case, the user is warned by an alarm sound and the information displayed on the LCD: "Please check the recording sheet."

In the instant embodiment, a cut sheet has been used as the recording sheet, but a roll of sheet can also be used similarly. However, the cut sheet has the advantage of eliminating a waste of the recording sheet which occurs with divided recording, since the footer mark is recorded on the line following the end of one page of received image information.

Figure 12:
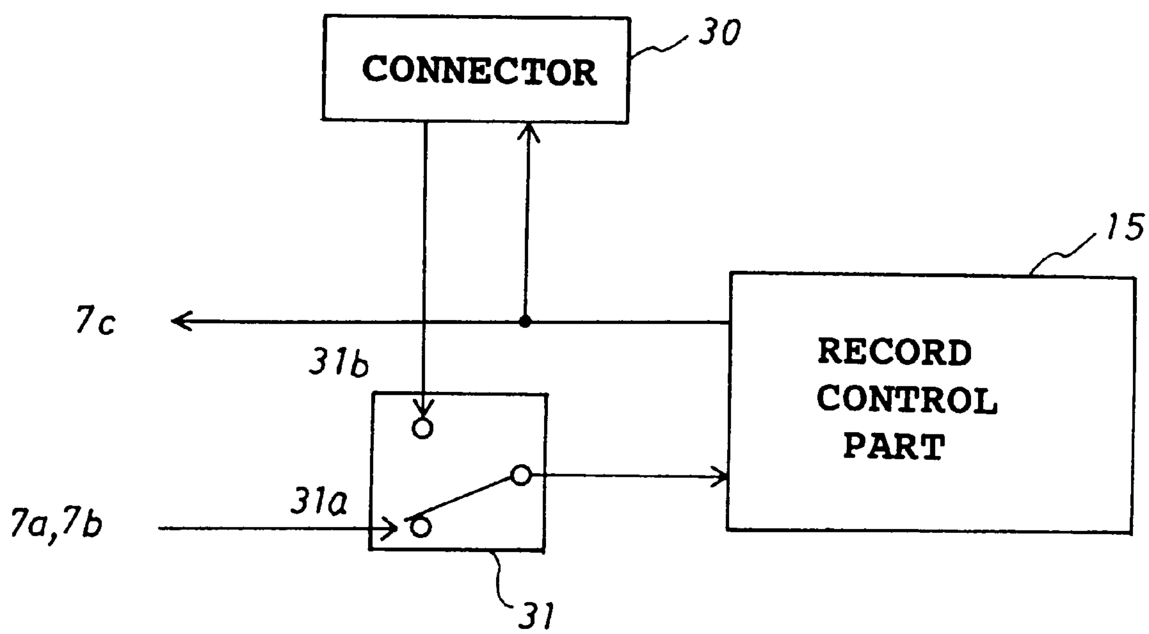
FIG. 12 is a block diagram of the portions to be added to the facsimile apparatus having a printer interface in the present invention.

Furthermore, a recording apparatus using the above-described head generally has a high resolution, and can sufficiently be used as a printer for a personal computer or the like. Thus, it is also possible to form the apparatus into a facsimile device with a printer function by further adding a printer interface. FIG. 12 is a block diagram of the main part of such a structure, illustrating a block segment added to the path ranging from the resolution conversion circuit 2 and the change-over circuit 5 to the record control part 15 in FIG. 1. In this drawing, the numeral 30 is a printer interface connector (generally, a Centronics Interface) for connection to a personal computer. The numeral 31 is a control change-over circuit which switches over the path of the control signal wire 7 by the control of the CPU 6. The user can select the mode of the facsimile or printer by depressing a mode selection button (not shown) of the operating part (not shown). For use as a facsimile, the control change-over circuit 31 is connected to the 31*a* side by the CPU 6, thereby enabling the aforementioned facsimile action. For use as a printer, the control change-over circuit 31 is connected to the 31*b* side by the CPU 6, thereby enabling a printer action under control by a personal computer connected to the connector 30. The control signal wire 7 complies with the Centronics Interface as mentioned earlier, thus permitting such a simple switch-over.

Thanks to the above-described construction, footer mark recording is not done during the printer mode.

As noted above, there is provided a facsimile apparatus comprising a recording means for recording an image onto a recording sheet, a density detecting means for detecting the density of the recording surface of the recording sheet, and a control means for performing control such that after recording of the image is completed, a predetermined footer mark is recorded by the recording means at a predetermined position of the recording sheet, and the density of the record position of the footer mark is detected by the density detection means. So constructed, the apparatus can reliably judge based on the output level of the density detection means that reception and recording by facsimile have not been performed normally owing to clogging as well as ink exhaustion.

Furthermore, the footer mark is recorded only when a facsimile-received image has been recorded. This enables discrimination from a copied recording sheet at first sight. With a facsimile apparatus with printer function as a terminal for a personal computer or the like, facsimile-received recording sheets and printouts from the personal computer may be mixed and stacked. By such recording of the footer mark, received message recording sheets and printouts can be distinguished easily.

Footer mark recording also confers the effect of preventing the footer mark from being mistaken for a received image, by providing a recording means capable of changing records resolution or records density. This can be easily achieved because the head generally has a higher density of recording capacity than the resolution of facsimile (8 pels× 3.75 lines/mm or 7.71 lines/mm).

Most files for use in arranging documents are generally closed leftward. Most originals to be transmitted also have sentences written with margins provided on the left. Hence, the footer mark can be made less showy by locating the record position of the footer mark and the detection means for its density at the most left-hand end of the record range with respect to the direction of the conveyance of the recording sheet.

When a cut sheet is to be used as a recording sheet, the apparatus has a rear end detection means for detecting the rear end of the recording sheet, and a conveying means for conveying the recording sheet over a predetermined distance. Both these means enable the footer mark to be recorded at a predetermined position away from the rear end of the recording sheet. By so doing, the footer mark can always be recorded at a fixed position away from the rear end of the recording sheet, even if cut sheets of an arbitrary length are mounted. As a result, even with the use of cut sheets, the footer mark and facsimile-received images can be distinguished easily.

In addition, the rear end detection means is disposed in the vicinity of the footer mark record position (ideally, on the same straight line). Even if the recording sheet travels obliquely, therefore, the footer mark can be reliably recorded somewhere on the recording sheet, thus conveying the effect of safety design that the footer mark detecting action can be performed without fail. If the rear end detection means is not disposed in the vicinity of the footer mark record position, the footer mark may be recorded at a place where there is no sheet. In this case, there is a possibility that reliable footer mark detection cannot be done. Thus, the placement of the rear end detection means near the footer mark record position is great in efficacy.

EMBODIMENT 3

Figure 13:
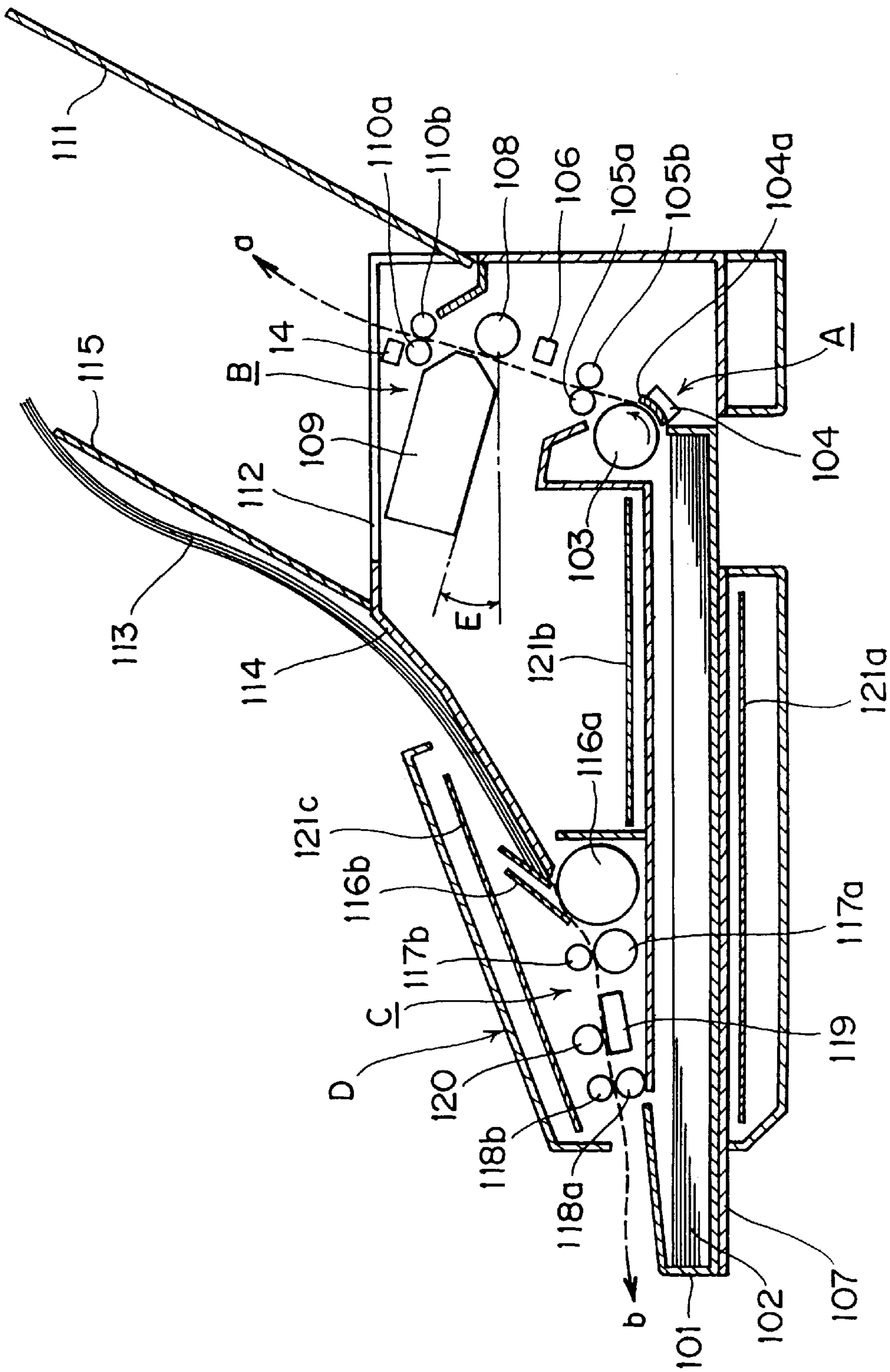
FIG. 13 is a first entire structure explanatory drawing for a facsimile apparatus as a third embodiment of the present invention.
Figure 14:
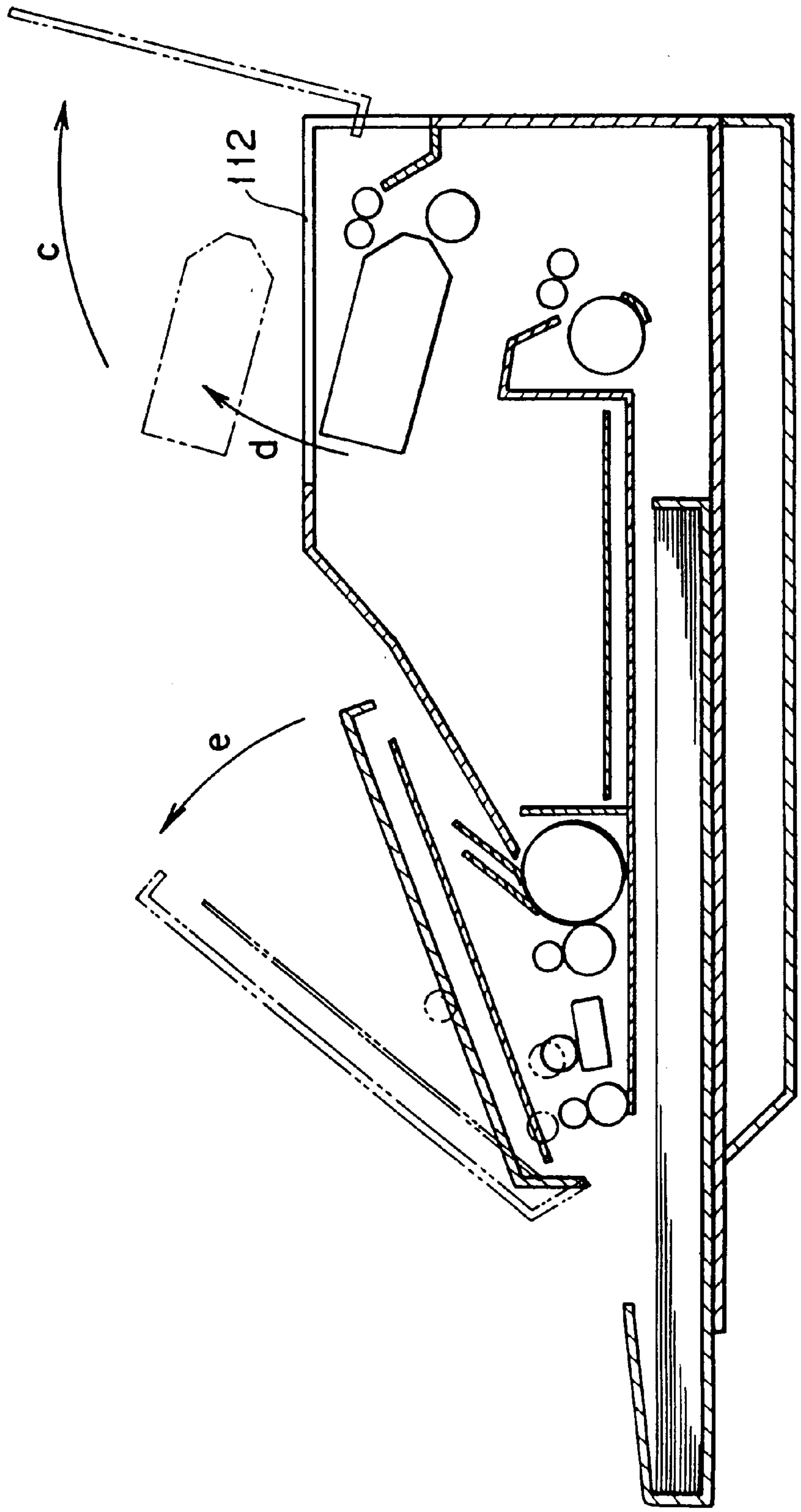
FIG. 14 is a second entire structure explanatory drawing for the facsimile apparatus as the third embodiment of the present invention.
Figure 15:
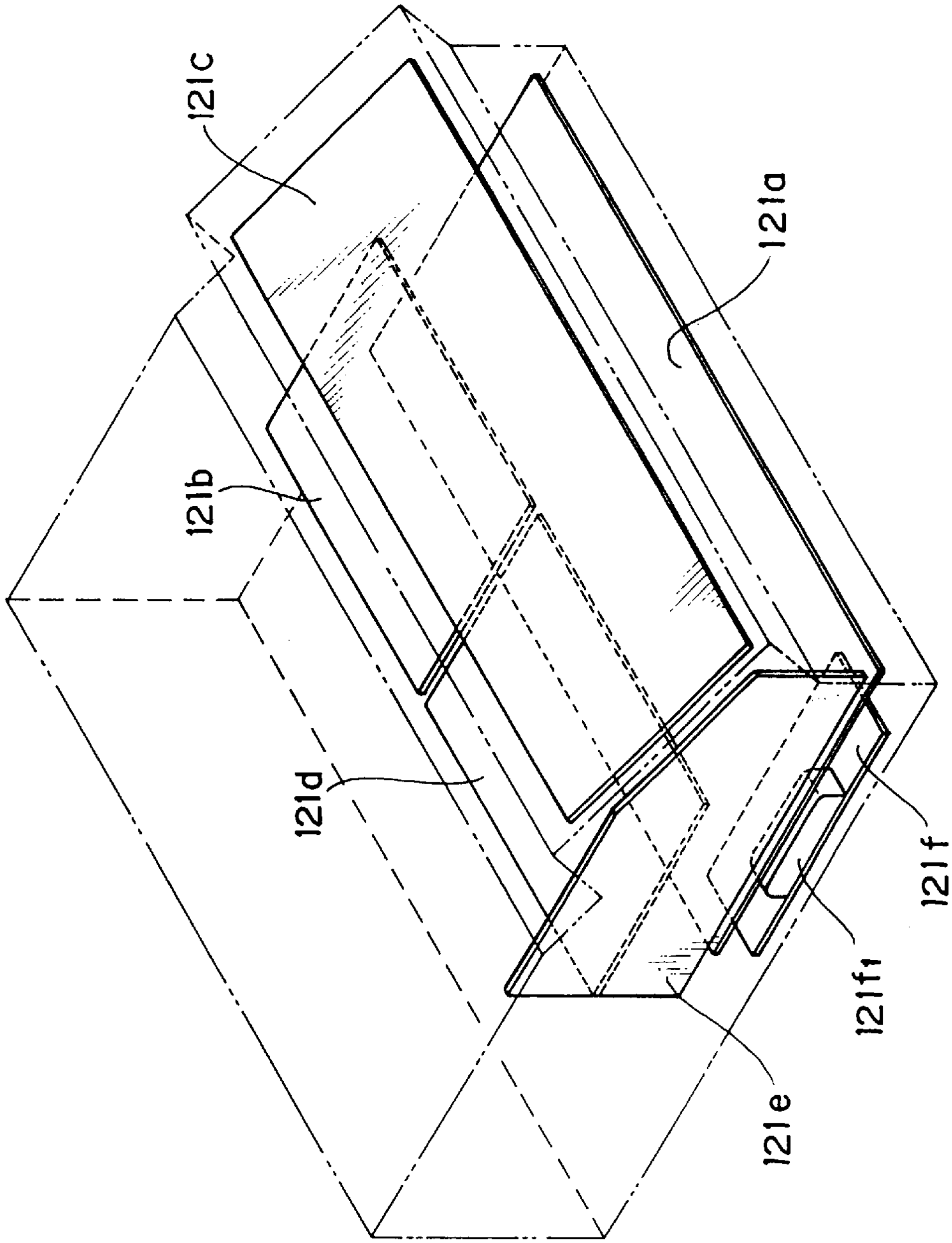
FIG. 15 is an explanatory perspective drawing for the transmission system layout and appearance of the facsimile apparatus as the third embodiment of the present invention.
Figure 16:
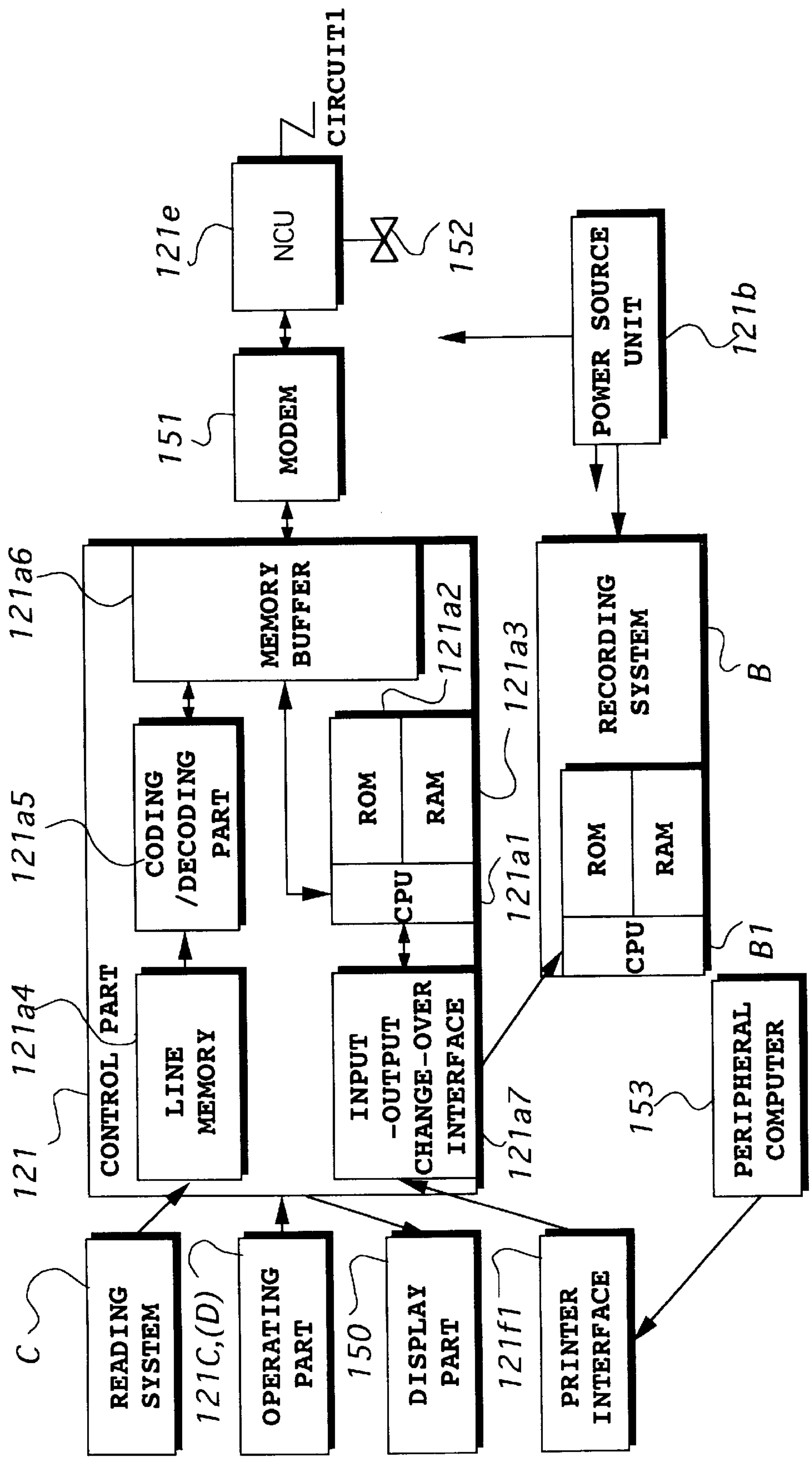
FIG. 16 is an explanatory block diagram of recording control in the third embodiment of the present invention.
Figure 17:
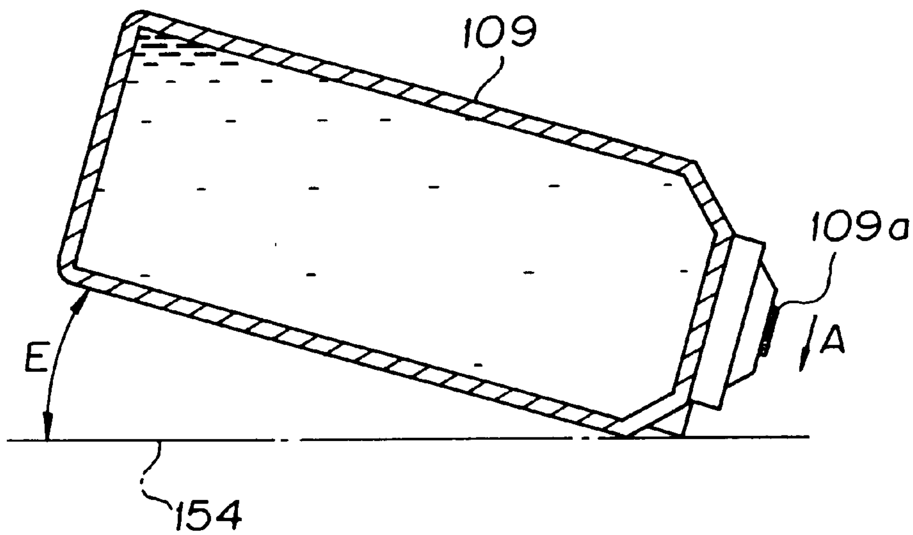
FIG. 17 is an explanatory detail drawing of the recording head in the third embodiment of the present invention.
Figure 18:
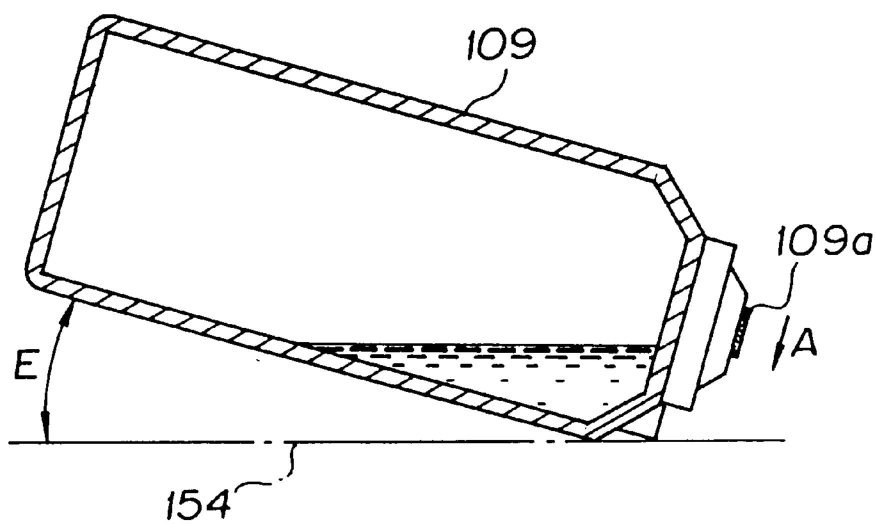
FIG. 18 is an explanatory detail drawing of the recording head in the third embodiment of the present invention.

FIG. 13 is a first entire structure explanatory drawing of a facsimile apparatus as a third embodiment of the present invention. FIG. 14 is a second entire structure explanatory drawing of the same apparatus. FIG. 15 is an explanatory perspective drawing showing the layout and appearance of the transmission system of the same apparatus. FIG. 16 is an explanatory block diagram for record control of the same apparatus. FIGS. 17 and 18 are each an explanatory detail drawing of the recording part B of the same apparatus.

[Explanation for the entire facsimile apparatus]

First, the entire structure of the facsimile apparatus will be described with reference to FIGS. 13 and 14.

This facsimile apparatus is composed, as shown in FIG. 13, of a sheet feed system A for feeding a recording sheet, a recording system B as a recorder, a reading system C for reading the image entered in the document, and an operating part D.

The sheet feed system A has a sheet feed portion comprising a sheet feed roller 103 and a sheet feed piece 104 in contact with the roller 103. The sheet feed portion separates and feeds one by one recording sheets 102 laid on a sheet feed cassette 101. The so separated recording sheet 102 is conveyed by a pair of feed rollers 105*a,* 105*b,* and supplied to the recording system B to be described later. Ahead of and close to the recording system B is provided a front end sensor 106, such as photosensor or microswitch, which detects the front end position of the recording sheet 102.

The sheet feed cassette 101 is provided detachably to a body 107, while the sheet feed roller 103, sheet feed piece 104, feed rollers 105*a,* 105*b,* and front end sensor 106 are provided in the apparatus body 107.

The recording system B records an image onto the recording sheet 102 fed by the sheet feed system A, in accordance with an image signal transmitted by another machine, or an image signal transmitted by the reading system C to be described later, or data output from the computer to be described later. That is, the recording sheet 102 is carried by a platen roller 108 of the recording system B, and ink droplets ejected by an ink jet cartridge 109 responsive to the image signal or data adhere to the recording sheet 102, thereby forming an image.

The recording sheet 102 having a predetermined image formed thereon is further carried in the direction of arrow a, discharged by a pair of discharge rollers 110*a,* 110*b* to the outside, and laid on a recording sheet tray 111.

The platen roller 108, and discharge roller pair 110*a,* 110*b* are each provided in the apparatus body 107.

The ink jet cartridge 109 is adapted to be detachable from the apparatus body 107 in the direction of arrow d, by opening a record cover 112 in the direction of arrow c.

The reading system C throws light onto an original 113, converts reflected light into an electrical signal, and conveys this signal to another machine in accordance with an operating mode, or transmits it to the recording system B of the apparatus.

In detail, a plurality of originals 113 are laid on an original bearing plate 114 and an original tray 115, and the originals 113 are separated and fed one by one by a separation roller 116*a* and a pressure piece 116*b* in pressure contact with the roller 116*a.* The so separated original 113 is carried by a pair of carrier rollers 117*a,* 117*b* and discharge rollers 118*a,* 118*b* for discharge to the outside. While the original 113 is being carried, image information is read by a reading part comprising a photoelectric conversion element 119 such as contact sensor and a white roller 120. The resulting image signal is transmitted to the recording system of the apparatus in the case of copying mode, or is transmitted to the recording system of another machine in the case of transmission mode.

The original bearing plate 114, original tray 115, separation roller 116*a,* carrier roller 117*a,* discharge roller 118*a,* photoelectric conversion element 119, and white roller 120 are each provided in the apparatus body 107.

The operating part D is a member for performing operations such as mode change-over operation, copying operation, transmitting operation, and printing operation. It is provided with keys corresponding to these various operations.

The operating part D is provided above an original carriage mechanism in the reading system C. As shown in FIG. 14, it is adapted to be rotatable in the direction of arrow e relative to the apparatus body 107. On one end side of the operating part D is provided a hand set of a telephone (not shown) for transmission and reception.

Next, an explanation will be give for the explanatory perspective view for the layout and appearance of a transmission system as in FIG. 15.

A system substrate 121*a* of the apparatus is provided at the bottom of the apparatus, and a power source unit 121*b* is provided on the right-hand side of the apparatus. The apparatus further has an operating panel 121*c* for controlling the operating part D, a relay substrate 121*d,* an NCU substrate unit 121*e* for controlling the telephone and telephone circuit, and a substrate 121*f* bearing a printer interface 121*f*1.

Next, the apparatus will be described concretely.

[Sheet feed part]

The sheet feed roller 103 is a roller made of a material with a high friction coefficient such as silicone rubber, and takes out the uppermost recording sheet 102 within the sheet feed cassette 101 while rotating in the direction of arrow in FIG. 13. The sheet feed piece 104 supports a sheet portion 104*a,* such as cork-containing urethane rubber, rotatably by an arm portion (not shown), and is pressed against the sheet feed roller 103 by a spring or the like (not shown).

Accordingly, when the sheet feed roller 103 in contact with the recording sheet 102 is rotated by a drive source (not shown), the sheet feed roller 103 draws out one recording sheet 102, the uppermost one. If, at this time, a plurality of the recording sheets 102 are drawn out, the lower sheets of them are kept from being carried owing to contact friction with the sheet portion 104*a*. Thus, only the uppermost sheet is sent to the feed roller pair 105*a,* 105*b,* and then conveyed thereby.

[Recording sheet]

The recording sheet 102 may be a paper, a plastic sheet, or any other material onto which ink can be transferred. In the instant embodiment, a paper cut to the B4 or A4 size is used as the recording sheet 102. The sheet feed cassette 101 bearing the recording sheets 102 is housed at a predetermined position (the position in FIG. 13) of the apparatus body 107.

[Explanation for the control system]

Next, the control system of the apparatus will be described with reference to a block diagram given as FIG. 16.

As illustrated in FIG. 16, the control system of the apparatus comprises a control part 121 for the facsimile, a power source unit 121*b* for supplying electric power to the entire apparatus, an NCU substrate unit 121*e* for connecting a MODEM 151, a telephone (hand set) 152, and the circuit together, a display part 150 for displaying the contents, etc. entered from the operating part 121*c,* and a printer interface 121*f*1 for obtaining data from a peripheral computer 153.

The above-mentioned control part 121 has a CPU 121*a*1 for controlling the entire apparatus, a ROM 121*a*2 storing various programs and various data, a RAM 121*a*3 which is used as a work area for the CPU 121*a*1 and which transiently stores various data such as the number of sheets recorded, an input-output change-over interface 121*a*7 for switching over the facsimile and the printer, a line memory 121*a*4, a coding/decoding part 121*a*5, and a memory buffer 121*a*6.

The line memory 121*a*4 accommodates images from the respective lines of image data. It houses image data corresponding to one line from the original reading system C in the case of original transmission or copying, and houses data corresponding to a composite line in the case of image data reception. The image data accommodated in the line memory 121*a*4 is passed through the CPU 121*a*1, where a recording system control code is added, and supplied to a CPU B1 of a recording system B via the input-output change-over interface 121*a*7. The CPU B1 decodes the recording system control code to perform image recording.

The coding/decoding part 121*a*5 codes image information to be transmitted, like MH coding, or decodes coded image data received to convert it into image data. The memory buffer 121*a*6 accommodates coded image data transmitted or received.

Next, the control of printing function will be described.

First, data and recording system control code are incorporated from the peripheral computer 153 into the apparatus via the printer interface 121*f*1. Then, they are supplied to the CPU B1 of the recording system B via the input-output change-over interface 121*a*7. The CPU B1 decodes the recording system control code to perform print recording. On this occasion, the CPU 121*a*1 of the control part 121 is adapted not to control print recording. By so doing, change-over of the facsimile and the printer is facilitated.

[Recording part]

The recording part B is characterized in that as shown in FIGS. 13, 17 and 18, the ink cartridge 109 is inclined forward at an angle of E (15° in the instant embodiment) to the mounting plane 154. That is, a nozzle 109*a* for ejecting ink is provided at the end of the ink cartridge 109. That surface of the nozzle which constitutes an ink ejection orifice, i.e. the ejection surface, is inclined with respect to the vertical direction. Other construction is the same as in the first embodiment.

FIG. 17 shows the ink cartridge 109 full of ink, while FIG. 18 shows the ink cartridge 109 empty of ink.

By inclining the ink cartridge 109 with respect to the mounting plane 154 (normally, horizontal), namely, by inclining the ejection surface of the nozzle 109*a* relative to the vertical direction, if ink is nearly emptied, ink fails to be ejected at each ejection orifice of the nozzle 109*a* progressively from the upstream side of the direction of arrow A. In the present invention, this action is utilized in detecting promptly whether ink is present or not within the ink cartridge. That is, in FIGS. 17 and 18, ink ejected from some ejection orifices on the upstream side of the direction of arrow A in the nozzle 109*a,* i.e. upper ejection orifices, is adapted to record a footer mark. By so doing, the presence or absence of ink within the ink cartridge can be detected rapidly. Specifically, even if ink is impregnated into the sponge within the ink cartridge 109, for example, ink is consumed, beginning at the upper part. Thus, at a time when the footer mark is no longer recorded, the decrease in the amount of ink within the ink cartridge can be detected, meaning that the presence or absence of ink can be detected early. Since the footer mark is recorded with ink ejected only from the upper ejection orifices, the resulting footer mark is less showy than the one recorded with ink ejected from all ejection orifices. Hence, it never hampers the record grade of the entire recording sheet.

As shown in FIG. 13, moreover, the recording part B including the ink cartridge 109 is inclined with respect to the horizontal mounting plane to incline the passageway for the recording sheet 102 with respect to the vertical direction. Consequently, the recording sheet 102 is discharged in the direction of arrow a (i.e. in an inclined manner with respect to the vertical direction). Thus, the recording sheet is inclined toward the discharge tray 111 by its own weight, and stacked thereon naturally. Assume for example, that the ink cartridge 109 of the recording part B is mounted parallel to the horizontal mounting plane, its ejection surface is vertical to the mounting plane, and the path of the recording sheet 102 is also vertical. In this case, the recording sheet 102 is discharged vertically with respect to the mounting plane. Hence, one cannot say definitely which of the discharge tray 111 side and the opposite side the recording sheet will fall on. Thus, in order to urge the recording sheet 102 in the direction of arrow a in FIG. 13 toward the discharge tray 111, the angle of the discharge roller 110*a* has to be changed. However, the recording sheet as recorded with an ink jet has the ink still unfixed. If the path of sheet discharge is changed abruptly relative to the recording part, the discharge roller 110*a* stains the printed surface of the recording sheet 102.

The aforementioned inclination of the recording part B with respect to the mounting plane affords the effect of stacking up the recording sheets on the discharge tray 111 without staining the print image (information).

Figure 19:
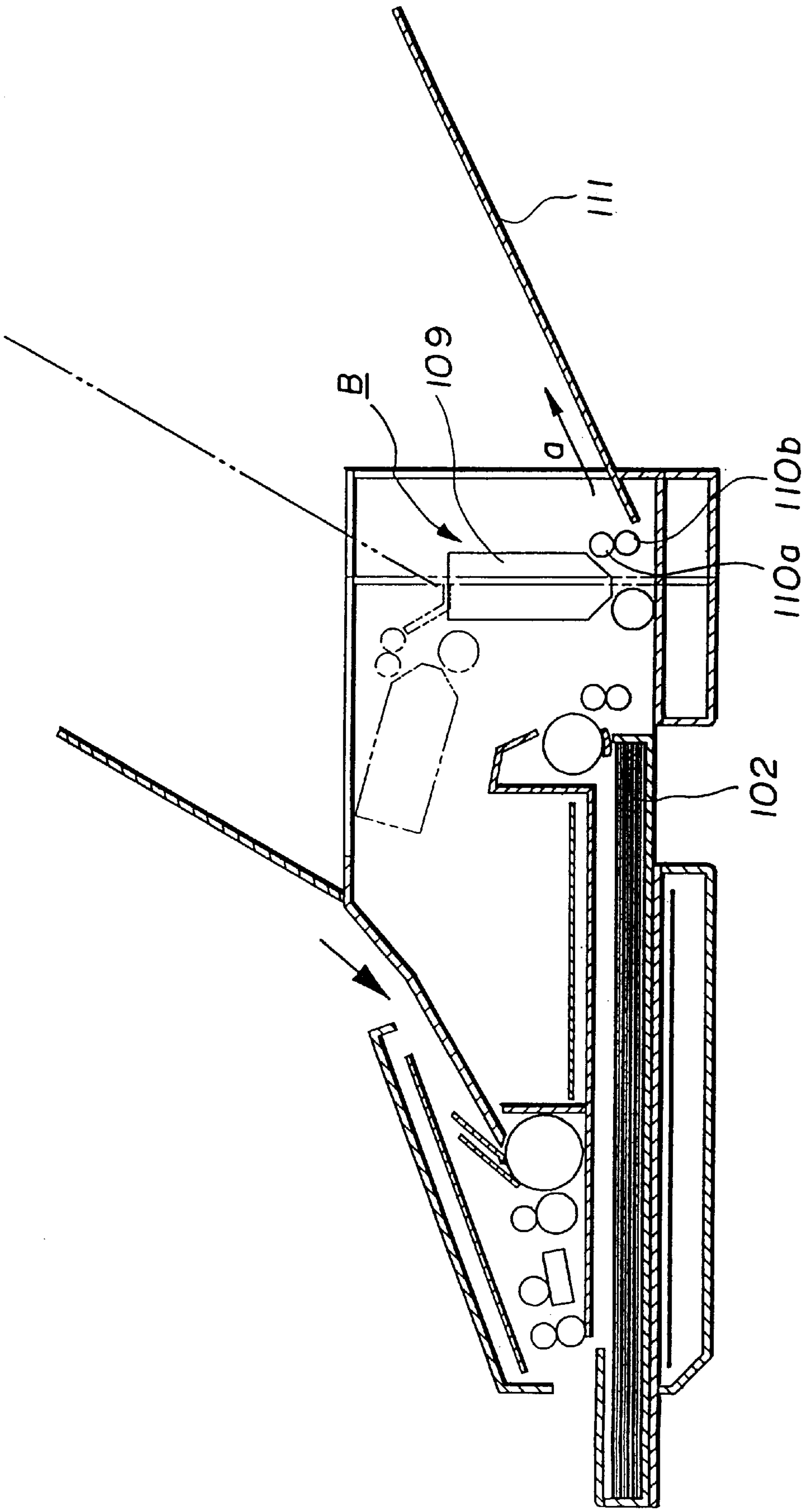
FIG. 19 is an entire structure explanatory drawing of a comparative apparatus for the facsimile apparatus as the third embodiment of the present invention.

Assume another case, as illustrated in FIG. 19, in which the recording part B is constructed such that the ink cartridge 109 is vertical to the horizontal mounting plane, i.e. the ejection surface faces downward. In this case, the recording sheet 102 is discharged in the direction of arrow a in FIG. 19 or nearly horizontally with respect to the mounting plane. According to such construction, the recording sheet 102 with the ink still unfixed suffers the following trouble as mentioned above: An abrupt change in the path of sheet discharge relative to the recording part B causes the discharge roller 110*a* to stain the printed surface of the recording sheet 102. To avoid this trouble, the discharge space for the recording sheet 102 must be equivalent to the size of the recording sheet 102. This results in the drawback that the area for mounting of the apparatus body is about 1.8 to 2 times as large as that for the construction of FIG. 13 characteristic of the present invention.

Also, with the construction of FIG. 19, the recording sheet 102 is discharged nearly horizontally relative to the mounting plane. Thus, friction occurs between the recording sheets 102 already piled up on the discharge tray 111 and the recording sheet 102 sent to the tray 111 subsequently. The previous recording sheets are pushed out by the subsequent recording sheet, and dropped out of the discharge tray 111, making the load efficiency of the recording sheets 102 very poor. To eliminate this drawback, the sharp angle of the ejection surface to the vertical direction is set at 60° or less as a characteristic of the present invention. This inclined structure coupled with the own weight action of the recording sheet 102 makes the load efficiency of the recording sheets on the discharge tray 111 satisfactory, and removes the defect that the recording sheets may fall out of the discharge tray. Such a construction also enables the ink cartridge 109 to be mounted from obliquely behind or from above the apparatus, making the ink cartridge 109 attachable and detachable better. An additional advantage of such a construction is that the recording sheets 102 can be loaded in an inclined manner with respect to the mounting plane. Thus, the user can easily recover the recording sheets, and the area for mounting of the apparatus body can be reduced. Consequently, downsizing of the apparatus becomes possible. If the recording part is constructed such that the ejection surface faces downward as shown in FIG. 19, ink is ejected downward, causing detection of no ink and poor recording to occur nearly simultaneously. If, until stoppage of recording by ink ejection, printing is continued in the presence of poor recording, data during this period may be lost. According to the present invention constructed as in FIGS. 13, 17 and 18, the absence of ink can be detected before ink is completely consumed. Hence, the problem of data loss never occurs. Thus, the present invention provides effective means giving effects involved in the fundamental performance.

As discussed above, the angle of forward inclination of the ink cartridge 109, namely the sharp angle of its ejection surface relative to the vertical direction, is preferably within 60°.

EMBODIMENT 4

Figure 20:
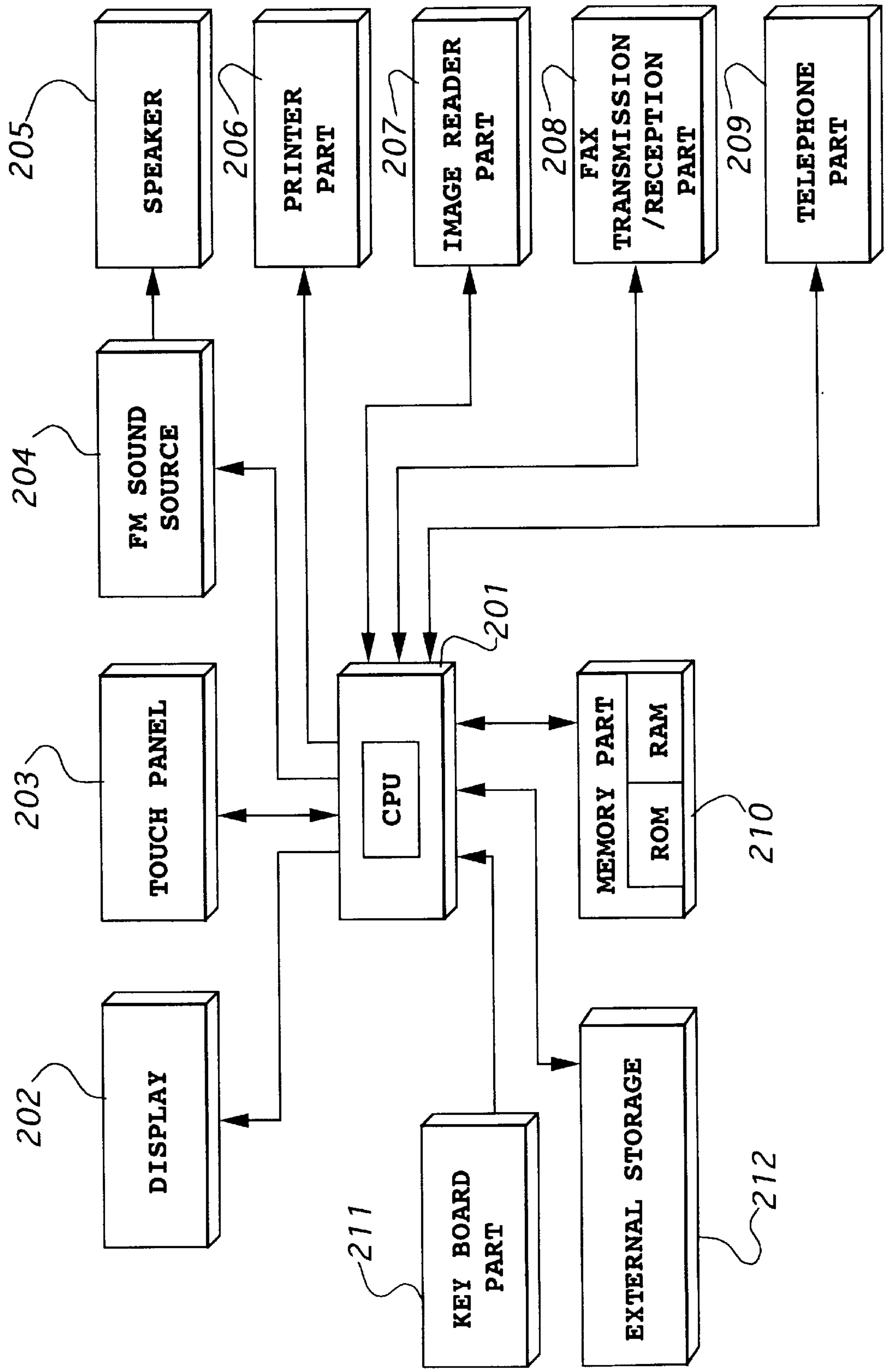
FIG. 20 is a block diagram of an apparatus as a fourth embodiment of the present invention.

FIG. 20 is a block diagram showing the outlined structure of the recording apparatus of the present invention applied to an information processing unit having functions of a word processor, a personal computer, a facsimile apparatus, and a copying machine. In the drawing, the numeral 201 is a control part for controlling the entire apparatus. This control part 201 has a CPU such as microprocessor and various I/O ports. It supplies control signal and data signals to various parts, and obtains control signals and data signals from various parts, thereby making control operations. The numeral 202 is a display part, which indicates on its screen various menus, various pieces of document information, and image data read by an image reader 207. The numeral 203 is a transparent pressure-sensitive touch panel provided on the display part 202. By pressing the surface of the touch panel 203 by a finger or the like, one can enter items, coordinates, etc. on the display part 202.

The numeral 204 is an FM sound source part, which reads music information, prepared from music data, etc. and stored as digital data in a memory part 210 or an external storage 212, and performs its frequency modulation. An electric signal from the FM sound source 204 is converted into an audible sound by a speaker part 205. A printer part 206 is the recording apparatus of the present invention applied as an output terminal for a word processor, a personal computer, a facsimile apparatus, and a copying machine.

The numeral 207 is an image reader part which photoelectrically reads and enters the data of the document. It is provided midway on the path of conveyance of the original to carry out reading of facsimile originals, copied originals, and various other originals. The numeral 208 is a facsimile transmission/reception part for facsimile transmission of original data read by the image reader 207, and for receiving and decoding facsimile signals sent in. The part 208 has an interface function to the outside. The numeral 209 is a telephone part having various telephone functions such as the ordinary telephone function and telephone message recorder function. The numeral 210 is a memory part including a ROM for storing a system program, a manager program, other application programs, character fonts, dictionary, etc., a RAM for storing application programs and character information loaded from the external storage 212, and a video RAM.

The numeral 211 is a key board part for entering document information and various commands. The numeral 212 is an external storage using floppy disks and hard disks as storage media. The external storage 212 accommodates character information, music or sound information, user's application programs, etc.

Figure 21:
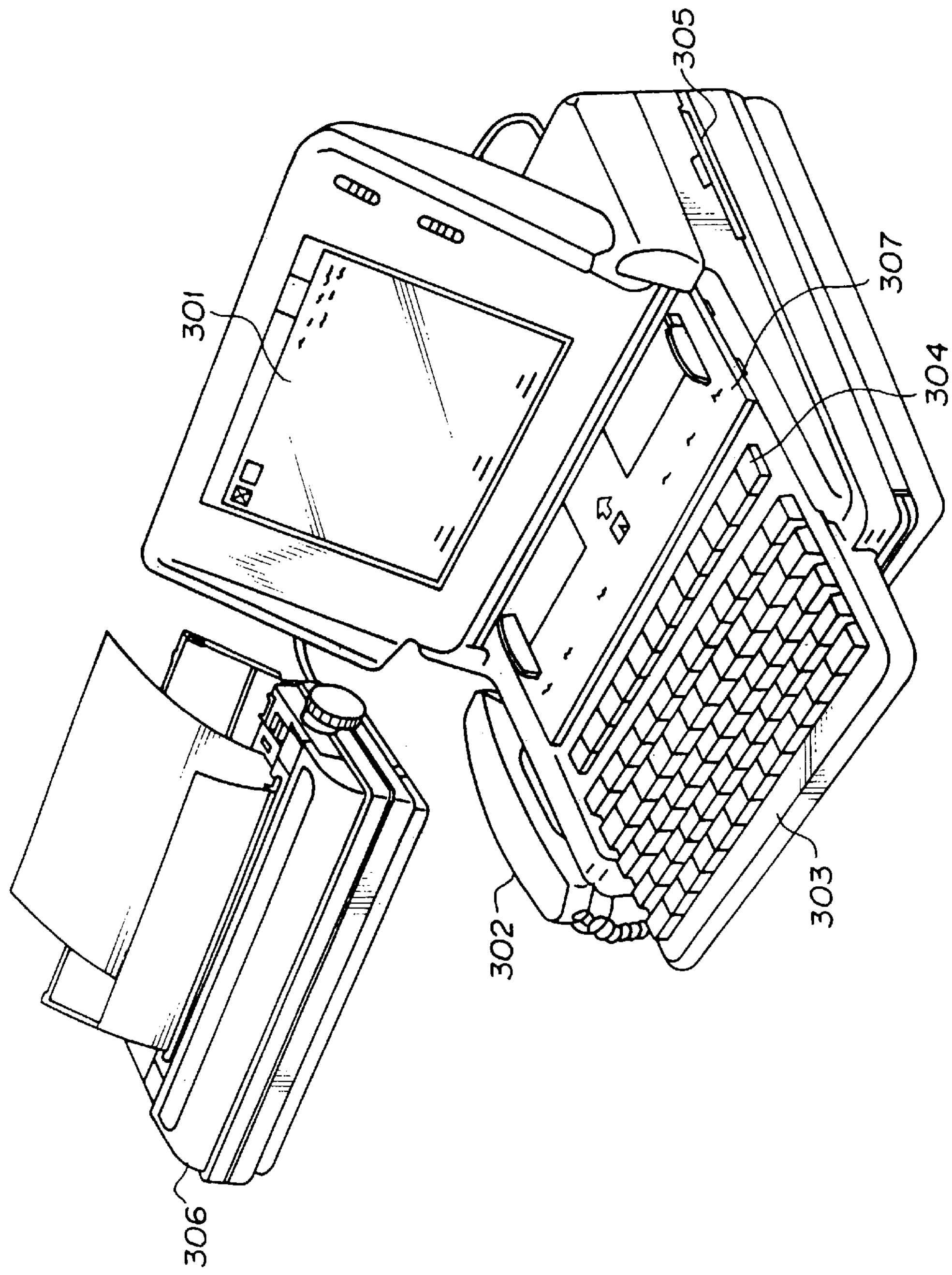
FIG. 21 is an outside drawing of the apparatus as the fourth embodiment of the present invention.

FIG. 21 is an outside drawing of the information processing unit shown in FIG. 20. The numeral 301 is a flat panel display using liquid crystal or the like, and displays various menus, graphic information, and document information. On the display 301 is disposed a touch panel, and one can enter coordinates and items by pressing the surface of the touch panel by a finger or the like. The numeral 302 is a hand set for use when the apparatus functions as a telephone. A key board 303 is connected detachably to the body via a cord, and permits entry of various pieces of character information and various data. The key board 303 has various function keys 304. The numeral 305 is an insertion port for a floppy disk.

The numeral 307 is a sheet bearing part on which the original to be read by the image data part 207 is laid. The original read is discharged from a rear part of the apparatus. In facsimile reception, an ink jet printer 306 is used for recording.

Figure 22:
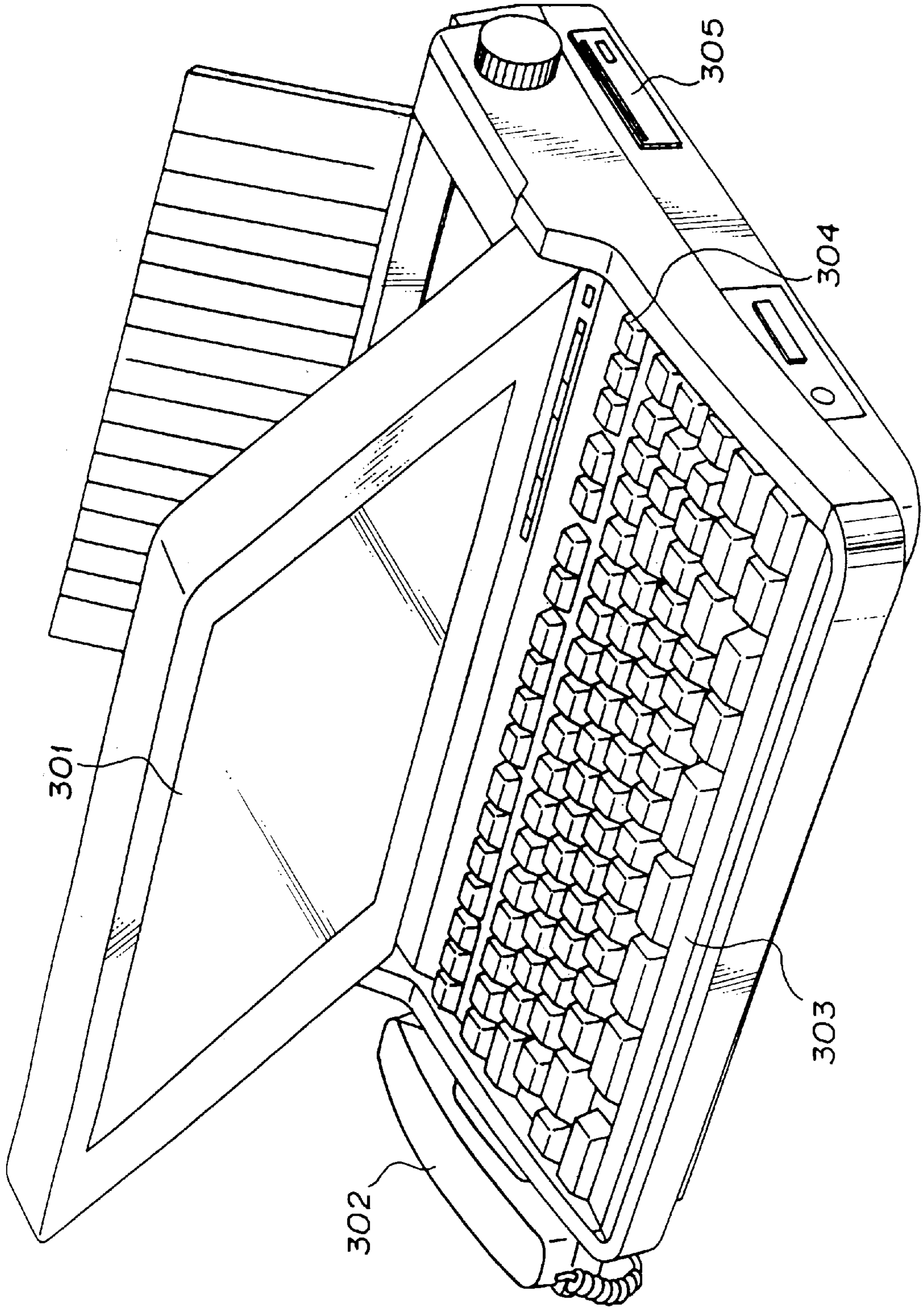
FIG. 22 is an outside drawing of another apparatus in accordance with a fourth embodiment of the present invention.

The display 301 may be a CRT, but should desirably be a flat panel using a ferroelectric liquid crystal, such as liquid crystal display. Such a flat panel will be light-weight as well as small in size and thickness. When the above-mentioned information processing unit functions as a word processor, character information entered from the key board part 211 in FIG. 20 is processed by the control part 201 in accordance with an original processing program, and outputted as an image to the printer part 206. When the information processing unit functions as a personal computer, various data entered from the key board part 211 are computed by the control part 201 in accordance with an application program, and the results of computation are outputted as an image to the printer part 206. When the information processing unit functions as a receiver for a facsimile apparatus, facsimile information entered from the facsimile transmission/reception part 208 via a communication circuit is received and processed by the control part 201 in accordance with a predetermined program, and outputted as a received image to the printer part 206. When the information processing unit functions as a copying machine, the original is read by the image reader part 207, and the data read is outputted as a copy image to the printer part 206 via the control part 201. When the information processing unit serves as a transmitter for a facsimile apparatus, the original data read by the image reader part 207 is processed by the control part 201 in accordance with a predetermined program, and then transmitted to the communication circuit via the facsimile reception/transmission part 208. The above information processing unit may be of an integral type with a built-in ink jet printer, as shown in FIG. 22. In this case, its portable characteristics can be enhanced. In FIG. 22, the portions having the same functions as in FIG. 21 are provided with the same numerals.

By applying the recording apparatus of the present invention to the above-described multi-functional information processing unit, a high grade recording image can be obtained, so that the functions of the information processing unit can be improved further.

[Others]

Of ink jet recording apparatuses, that of the present invention has a means for generating heat energy (e.g. electro-thermal converter or laser light) as energy for use in ink ejection, and exhibits satisfactory effects in a recording head or a recording device of the type causing change in condition to ink by use of heat energy. According to such a method, high density, high accuracy recording can be accomplished.

The representative structure and principle for such apparatus are preferably the basic ones disclosed, for example, in U.S. Pat. Nos. 4,723,129 and 4,740,796. These apparatuses may be used as those of the on-demand type or the continuous type. The on-demand type is particularly effective, because it is constructed such that at least one drive signal for giving a rapid temperature rise in excess of nucleate boiling responsive to record signal is applied to an electro-thermal converter disposed in correspondence with a sheet or liquid passage where liquid (ink) is kept, thereby generating thermal energy in the electro-thermal converter to cause film boiling to the heat-actuated surface of the recording head, and eventually form air bubbles in the liquid (ink) corresponding one-to-one to the drive signal. The liquid (ink) is ejected via the ejection orifices upon the growth and shrinkage of the air bubble, whereby at least one droplet is formed. When the drive signal is in a pulse form, growth and shrinkage of air bubbles take place immediately and properly, achieving highly responsive liquid (ink) ejection. Thus, the pulse form drive signal is more preferable. The suitable pulse form drive signal is described in U.S. Pat. Nos. 4,463,359 and 4,345,262. Even better recording can be carried out by use of the conditions described in U.S. Pat. No. 4,313,124 claiming an invention related to the temperature elevation rate of the heat-actuated surface as stated above.

As regards the construction of the recording head, the present invention includes not only a combination of ejection orifices, liquid passages, and electro-thermal converters (linear liquid passages or right-angle liquid passages) as disclosed in the above-mentioned U.S. patent specifications, but also the constructions disclosed in U.S. Pat. Nos. 4,558,333 and 4,459,600 in which the heat-actuated portion is located in a curved area. In addition, the effect of the present invention is exhibited when using a construction disclosed in Japanese Patent Application Laying-open No. 59-123670 in which a common slit is used as an ejection portion for a plurality of electro-thermal converters, or a construction disclosed in Japanese Patent Application Laying-open No. 59-138461 in which openings for absorbing the pressure wave of thermal energy are made to face the ejection portions. Whatever form the recording head takes, the present invention permits reliable and efficient recording.

The present invention can also be applied effectively to a full-line type recording head having a length corresponding to the maximum width of the recording medium on which the recording apparatus can record. Such a recording head may be either a combination of a plurality of recording heads which fulfills that length, or an integrally formed single recording head.

In addition, the present invention is effective even when using a similar serial type recording head fixed to the apparatus body, or a replaceable chip type recording head which, when mounted in the apparatus body, enables electrical connection with the body or ink supply from the body, or a cartridge type recording head having an ink tank integrally to the recording head itself.

In the recording apparatus of the present invention, the addition of ejection recovery means for the recording head or preliminary auxiliary means is preferred, since that could further stabilize the effects of the present invention. Examples of such means include capping means for the recording head, cleaning means, pressurization or suction means, preliminary heating means using electro-thermal converters or different heating elements or combinations of these, and preliminary ejection means for performing ejection separately from recording.

In regard to the kinds or number of recording heads mounted, there may be used a single recording head corresponding to a single-color ink, or a plurality of recording heads corresponding to a plurality of inks with different recording colors or densities. That is, the recording mode of the recording apparatus may be that for a predominant color such as black, as well as that utilizing an integrally constructed recording head or a plurality of recording heads put together. Anyway, the present invention is extremely effective for an apparatus with at least one recording mode for different plural colors or a full color range involving mixed colors.

Additionally, the foregoing embodiments of the present invention explain ink as a liquid. The liquid may be one which solidifies at room temperature or below, but softens or liquefies at room temperature. Alternatively, it may be one becoming liquid when given a record signal, since, according to ink jet recording, ink itself is adjusted to a temperature within the range from 30° to 70° C. so that the ink viscosity may be controlled to ensure a stable range of ejection. Also, there may be used an ink which solidifies when allowed to stand and liquefies upon heating, in order to positively prevent heat energy-associated temperature rise by utilizing the increased temperature as energy for the change in state of ink from solid state to liquid state, or in order to prevent evaporation of ink. Anyway, the present invention can be applied when using ink becoming liquid only when given thermal energy, such as ink which liquefies upon exposure to thermal energy in response to a record signal and gets ejected, or ink which begins to solidify already when reaching the recording medium. Such ink may be one facing the electro-thermal converter in the state held as a liquid or solid material in the cavities or perforations of a porous sheet, as described in Japanese Patent Application Laying-open No. 54-56847 or Japanese Patent Application Laying-open No. 60-71260. In the present invention, the most effective apparatus for each of the above-described inks is one which carries out film boiling.

The present invention has been described in detail with respect to preferred embodiments, and it will now be clear that changes and modifications may be made without departing from the invention in its broader aspects. It is the invention, therefore, in the appended claims to cover all such changes and modifications as fall within the true spirit of the invention.

What is claimed is:

1. An image forming apparatus which performs recording on a recording medium using a recording head having an ink ejection surface in which an ink ejection orifice is formed, comprising:

- a mounting portion for mounting said recording head, said recording head being mounted on said image forming apparatus such that the ink ejection surface is inclined with respect to a vertical direction, and the ink ejection orifice ejects an ink in a direction which is different from the vertical direction;
- conveying means for conveying the recording medium, wherein a conveying path of said conveying means is located at a position opposed to the recording head along a direction inclined with respect to the vertical direction;
- a discharging part for discharging the recording medium, said discharging part discharging the recording medium along the direction inclined with respect to the vertical direction; and
- control means for causing said recording head to elect ink droplets in order to detect a condition of ink ejection of the recording head.

2. An image forming apparatus as claimed in claim 1, in which the sharp angle of the ink ejection surface to the vertical direction is within 60°.

3. An image forming apparatus as claimed in claim 1, in which the recording head ejects ink by causing a change in state to the ink by use of thermal energy.

4. An image forming apparatus as claimed in claim 1, which further includes means for receiving image information.

5. An image forming apparatus as claimed in claim 1, which further includes means for transmitting image information.

6. An image forming apparatus as claimed in claim 1, which further includes means for reading the image of an original.

7. An image forming apparatus as claimed claim 1, which further includes means for printing a footer mark.

8. An image forming apparatus as claimed in claim 7, which further includes a photosensor, and said footer mark has its size in a range where the footer mark can be detected by the photosensor.

9. An image forming apparatus as claimed in claim 1, which further includes means for inputting a record signal.

10. An image forming apparatus as claimed in claim 9, which further includes means for receiving image information and means for printing a footer mark, and having a mode for recording a image based on the image information inputted through the record signal inputting means and a mode for recording a image based on the image information inputted through the image information receiving means, and being set not to print the footer mark at the time to record the image based on the image information inputted through the record signal inputting means.

11. An image forming apparatus as claimed in claim 9, in which the record signal inputting means is a key board.

12. A recorded material as recorded by use of the image forming apparatus claimed in claim 1.

13. An image forming apparatus which performs recording using a recording head for recording an image corresponding to an image data onto a recording medium, comprising:

- control means for controlling the recording head so that an image for detecting may be recorded only by a part of the recording head at a predetermined position of the recording medium after a predetermined amount of image recording by the recording head is completed, the image for detecting being different from the image corresponding to the image data;
- detection means for detecting the image for detecting on the recording medium; and
- judgment means for judging the state of recording by the recording head on the basis of the results of detection by the detection means,
- wherein said control means controls the recording head in a first mode for recording the image for detecting, and in a second mode in which the image for detecting is not recorded.

14. An image forming apparatus as claimed in claim 13, wherein the recording head has an ink ejection surface in which an ink ejection orifice is formed, and the recording head is mounted to said ink jet recording apparatus so that the ink ejection surface is inclined with respect to the vertical direction.

15. An image forming apparatus as claimed in claim 14, in which the sharp angle of the ink ejection surface of the recording head to the vertical direction is within 60°.

16. An image forming apparatus as claimed in claim 13, in which the recording head ejects ink by causing a change in state to the ink by use of thermal energy.

17. An image forming apparatus as claimed in claim 13, which further includes means for receiving image information.

18. An image forming apparatus as claimed in claim 13, which further includes means for transmitting image information.

19. An image forming apparatus as claimed in claim 13, which further includes means for reading the image of an original.

20. An image forming apparatus as claimed in claim 13, which further includes means for printing a footer mark.

21. An image forming apparatus as claimed in claim 20, which further includes a photosensor, and said footer mark has its size in a range where the footer mark can be detected by the photosensor.

22. An image forming apparatus as claimed in claim 13, which further includes means for inputting a record signal.

23. An image forming apparatus as claimed in claim 22, which further includes means for receiving image information and means for printing a footer mark, and having a mode for recording a image based on the image information inputted through the record signal inputting means and a mode for recording a image based on the image information inputted through the image information receiving means, and being set not to print the footer mark at the time to record the image based on the image information inputted through the record signal inputting means.

24. An image forming apparatus as claimed in claim 22, in which the record signal inputting means is a key board.

25. An information processing apparatus comprising an ink jet recording apparatus and means for computation, wherein the ink jet recording apparatus performs recording on a recording medium using a recording head having an ink ejection surface in which an ink ejection orifice is formed, comprising:

a mounting portion for mounting said recording head, said recording head being mounted on said ink jet recording apparatus so that the ink ejection surface is inclined with respect to a vertical direction, and the ink ejection orifice ejects an ink in a direction which is different from the vertical direction;

conveying means for conveying the recording medium, wherein a conveying path of said conveying means is located at a position opposed to the recording head along a direction inclined with respect to the vertical direction;

a discharging part for discharging the recording medium, said discharging part discharging the recording medium along the direction inclined with respect to the vertical direction; and control means for causing said recording head to elect ink droplets in order to detect a condition of ink ejection of the recording head.

26. An information processing apparatus as claimed in claim 25, in which the sharp angle of the ink ejection surface to the vertical direction is within 60°.

27. An information processing apparatus as claimed claim 25, in which the recording head ejects ink by causing a change in state to the ink by use of thermal energy.

28. A recorded material as recorded by use of the information processing apparatus claimed claim 25.

29. An information processing apparatus using an ink jet recording apparatus and means for computation, wherein the ink jet recording apparatus performs recording using a recording head for recording an image corresponding to an image data onto a recording medium, said information processing apparatus comprising:

control means for controlling the recording head so that an image for detecting may be recorded only by a part of the recording head at a predetermined position of the recording medium after a predetermined amount of image recording by the recording head is completed, the image for detecting is a different image from the image corresponding to the image data;

detection means for detecting the image for detecting on the recording medium; and judgment means for judging the state of recording by the recording head on the basis of the results of detection by the detection means, wherein said control means controls the recording head in a first mode for recording the image for detecting, and in a second mode in which the image for detecting is not recorded.

30. An information processing apparatus as claimed in claim 29, wherein the recording head has an ink ejection surface in which an ink ejection orifice is formed, and the recording head is mounted to said ink jet recording apparatus so that the ink ejection surface is inclined with respect to the vertical direction.

31. An information processing apparatus as claimed in claim 30, in which the sharp angle of the ink ejection surface of the recording head to the vertical direction is within 60°.

32. An information processing apparatus as claimed claim 29, in which the recording head ejects ink by causing a change in state to the ink by use of thermal energy.

* * * * *

UNITED STATES PATENT AND TRADEMARK OFFICE

CERTIFICATE OF CORRECTION

PATENT NO. : 5,970,217

DATED : October 19, 1999

INVENTOR(S) : FUMIHIKO NAKAMURA

It is certified that error appears in the above-identified patent and that said Letters Patent is hereby corrected as shown below:

COLUMN 2

Line 16, "fear" should read --feared--;
Line 18, "there is fear" should read --it is undesirable--;
Line 33, "an" should read --a--; and
Line 51, "which" should be deleted.

COLUMN 3

Line 53, "a image" should read --an image--; and
Line 55, "a image" should read --an image--.

COLUMN 4

Line 27, "Also," should read --There is also--; and
Line 30, "And also," should read --There is furthermore--.

COLUMN 21

Line 40, "elect" should read --eject--.

COLUMN 22

Line 2, "a" should read --an--;
Line 4, "a" should read --an--;
Line 65, "a" should read --an--; and
Line 67, "a" should read --an--.

UNITED STATES PATENT AND TRADEMARK OFFICE
CERTIFICATE OF CORRECTION

PATENT NO. : 5,970,217

DATED : October 19, 1999

INVENTOR(S) : FUMIHIKO NAKAMURA

It is certified that error appears in the above-identified patent and that said Letters Patent is hereby corrected as shown below:

COLUMN 23

Line 28, "elect" should read --eject--;
Line 34, "claimed" should read --claimed in--; and
Line 38, "claimed" should read --claimed in--.

COLUMN 24

Line 34, "claimed" should read --claimed in--.

Signed and Sealed this

Seventh Day of November, 2000

Attest:

Q. TODD DICKINSON

Attesting Officer

Director of Patents and Trademarks